(12) United States Patent
Yuuki et al.

(10) Patent No.: US 7,855,763 B2
(45) Date of Patent: Dec. 21, 2010

(54) BACKLIGHT DEVICE AND TRANSMISSION TYPE DISPLAY APPARATUS

(75) Inventors: Akimasa Yuuki, Tokyo (JP); Kyoichiro Oda, Tokyo (JP); Naoko Iwasaki, Tokyo (JP); Shin Tahata, Tokyo (JP); Toru Kokogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 140 days.

(21) Appl. No.: 12/033,547

(22) Filed: Feb. 19, 2008

(65) Prior Publication Data

US 2008/0198295 A1      Aug. 21, 2008

(30) Foreign Application Priority Data

Feb. 19, 2007   (JP)   ............... 2007-038030
Oct. 15, 2007   (JP)   ............... 2007-267800

(51) Int. Cl.
*G02F 1/1333*   (2006.01)
(52) U.S. Cl. ............... 349/62; 349/63; 349/64
(58) Field of Classification Search ............... 349/62, 349/63, 64
See application file for complete search history.

(56) References Cited

U.S. PATENT DOCUMENTS

| | | | | |
|---|---|---|---|---|
| 5,299,042 A | * | 3/1994 | Takanashi et al. | ............... 349/7 |
| 5,479,275 A | * | 12/1995 | Abileah | ............... 349/5 |
| 7,210,815 B2 | * | 5/2007 | Imade | ............... 362/234 |
| 7,325,932 B2 | * | 2/2008 | Sakata | ............... 353/85 |
| 2004/0263500 A1 | * | 12/2004 | Sakata | ............... 345/204 |
| 2005/0002110 A1 | * | 1/2005 | Imade | ............... 359/640 |
| 2006/0077688 A1 | * | 4/2006 | Uehara et al. | ............... 362/613 |
| 2006/0186826 A1 | * | 8/2006 | Miyazawa | ............... 315/169.4 |
| 2007/0008456 A1 | * | 1/2007 | Lesage et al. | ............... 349/62 |
| 2007/0247872 A1 | * | 10/2007 | Lee et al. | ............... 362/616 |
| 2007/0297168 A1 | * | 12/2007 | Chang et al. | ............... 362/223 |
| 2008/0175129 A1 | * | 7/2008 | Tanaka et al. | ............... 369/112.23 |
| 2008/0285306 A1 | * | 11/2008 | Sugihara et al. | ............... 362/617 |
| 2009/0040426 A1 | * | 2/2009 | Mather et al. | ............... 349/65 |

FOREIGN PATENT DOCUMENTS

| | | |
|---|---|---|
| JP | 10-97199 | 4/1998 |
| JP | 2003-59321 | 2/2003 |
| JP | 3585781 | 8/2004 |
| JP | 2006-140125 | 6/2006 |
| KR | 10-2005-0000803 | 1/2005 |

* cited by examiner

*Primary Examiner*—K. Cyrus Kianni
(74) *Attorney, Agent, or Firm*—Oblon, Spivak, McClelland, Maier & Neustadt, L.L.P.

(57) ABSTRACT

A backlight device includes: a first prism sheet which has a triangular prism row on a major surface thereof; a first light source which emits light having directivity in a slanted direction with respect to a normal line direction of a light outgoing surface of the first prism sheet in opposite side to the triangular prism row side so as to enter into the triangular prism row of the first prism sheet; and a second light source which emits light having directivity in the normal line direction of the light outgoing surface of the first prism sheet so as to enter into the triangular prism row of the first prism sheet.

15 Claims, 26 Drawing Sheets

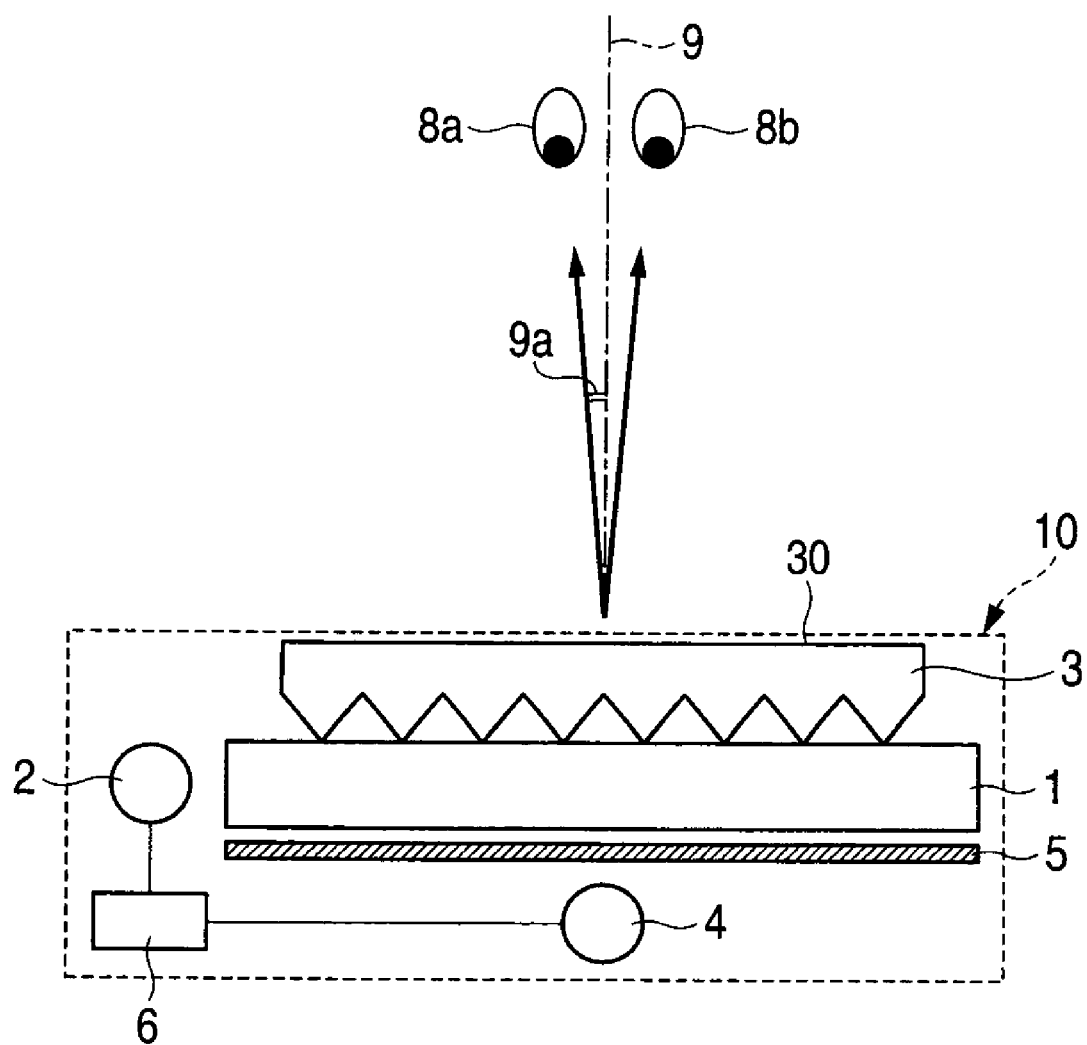

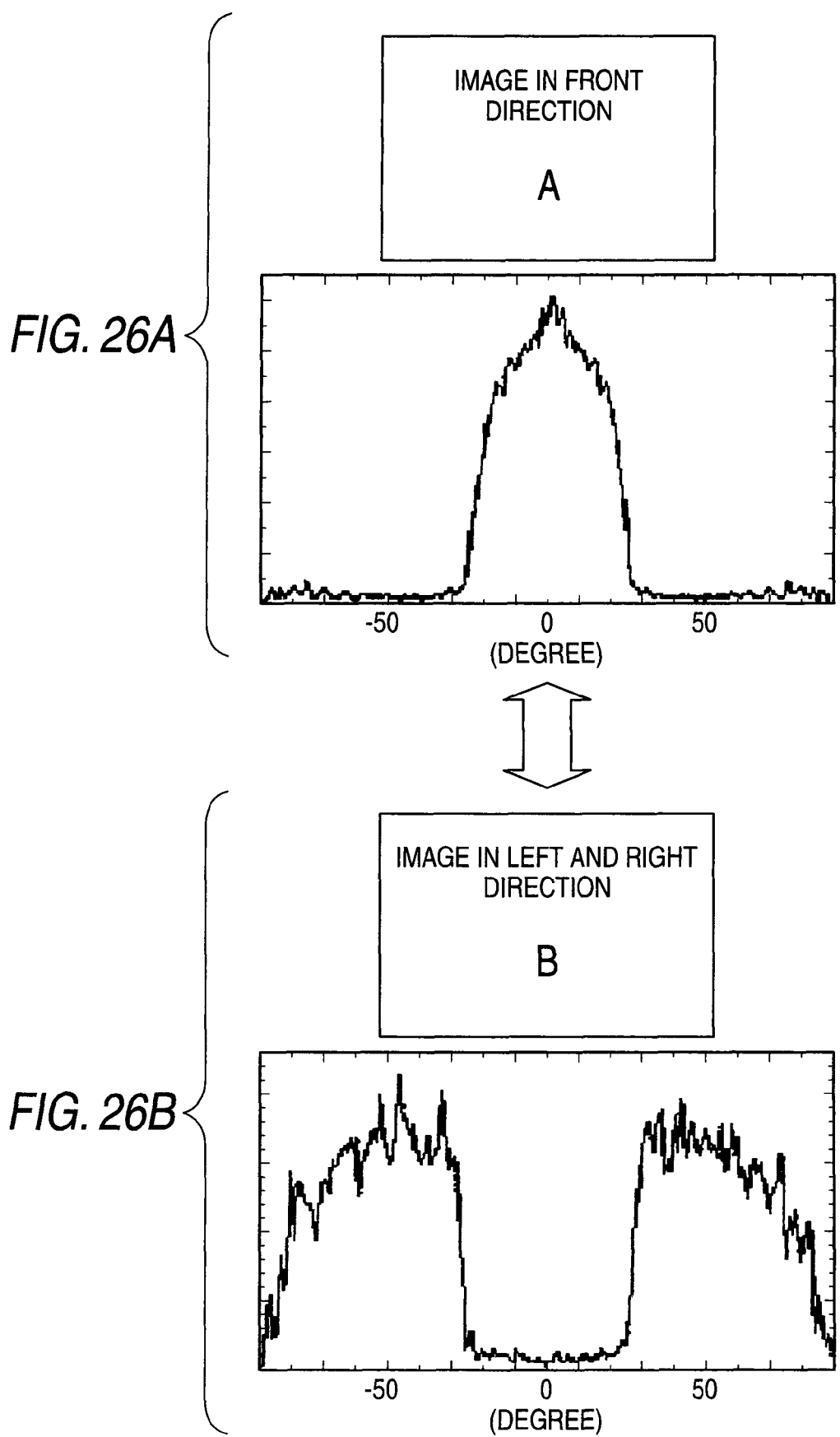

BACKLIGHT DEVICE AND TRANSMISSION TYPE DISPLAY APPARATUS

CROSS-REFERENCE TO RELATED APPLICATIONS

This application is based upon and claims the benefit of priority from Japanese Patent Application No. 2007-038030, filed Feb. 19, 2007, and Japanese Patent Application No. 2007-267800, filed Oct. 15, 2007, the entire contents of which are incorporated herein by reference.

BACKGROUND OF THE INVENTION

1. Field of the Invention

The present invention relates to a backlight device excellent in irradiation characteristics and a transmission type display apparatus excellent in display characteristics.

2. Description of the Related Art

There is disclosed a display apparatus in which light sources are disposed at different two light-incident end surfaces of a light guide plate, respectively, a double-sided prism lens sheet having a triangular prism row and a cylindrical lens row is disposed on the light outgoing surface side of the light guide plate, and a transmission type display panel is disposed on the light outgoing surface side of the prism sheet. According to the display apparatus, light rays emitted from the light sources are irradiated from the transmission type display panel at angles corresponding to parallax of left and right eyes, respectively, and parallactic images are alternately displayed on the transmission type display panel in synchronous with the light sources, whereby a three-dimensional display can be realized (see WO 2004/027492 A1, for example).

Further, there is disclosed a liquid crystal display apparatus using a liquid crystal display panel in which a parallax barrier layer and an image forming layer including a liquid crystal layer are provided via a transparent layer. According to the liquid crystal display apparatus, the distance between the image forming layer and the parallax barrier layer is adjusted to a distance suitable for the double image display. Thus, an image for a left side viewer and an image for a right side viewer formed on the image forming layer are conducted to the left side viewer and the right side viewer by transmission lights passed through the parallax barrier, respectively, whereby the double image display for displaying different images can be realized (see JP-A-2005-258016, for example).

According to the display apparatus shown in WO 2004/027492 A1, when two different images are repeatedly rewritten on the liquid crystal panel in synchronous with the changing-over of the lighting of the light sources disposed at the different two light-incident end surfaces of the light guide plate, it is possible to show different images to a user viewing in a range from the normal line direction of a display screen to 15 degrees to the left side therefrom and a user viewing in a range from the normal line direction to 15 degrees to the right side therefrom, respectively. However, when a main user sits just in front of the display panel, there arises a problem that two images are displayed in a mixed manner in the front direction.

Further, according to the display apparatus shown in JP-A-2005-258016, an image for a left side viewer and an image for a right side viewer are displayed on the image forming layer, and the parallax barrier is set so that the light rays emitted from the respective images are conducted to the left side viewer and the right side viewer, respectively. Thus, since the display angles are set to oblique angles, there arises a problem that the usability is not good when a user sits just in front of the display panel. Further, since the image forming layer is divided into two for a left side viewer and a right side viewer, respectively, there arises a problem that the number of pixels of an image being displayed becomes half. Further, since the transmission light is partially shielded by the parallax barrier, there arises a problem that the display becomes dark.

SUMMARY OF THE INVENTION

The present invention is made in view of the above problems of the related arts, and an object of the invention is to obtain a backlight device which can irradiate light rays to the left and right directions as well as the front direction.

Further, another object of the invention is to obtain a transmission type display apparatus which can display bright images to the left and right directions as well as the front direction.

According to an aspect of the present invention, a backlight device includes: a first prism sheet which has a triangular prism row on a major surface thereof; a first light source which emits light having directivity in a slanted direction with respect to a normal line direction of a light outgoing surface of the first prism sheet in opposite side to the triangular prism row side so as to enter into the triangular prism row of the first prism sheet; and a second light source which emits light having directivity in the normal line direction of the light outgoing surface of the first prism sheet so as to enter into the triangular prism row of the first prism sheet.

According to the above configuration, a light having directivity in the slanted direction with respect to the normal line direction of the light outgoing surface of the first prism sheet enters into the triangular prism row of the first prism sheet, then is reflected by the slanted surfaces of the triangular prism row of the first prism sheet and irradiated in the front direction. Further, a light having directivity in the directivity in the normal line direction of the light outgoing surface of the first prism sheet enters into the triangular prism row of the first prism sheet, then is refracted by the first prism sheet and irradiated in the left and right directions from the first prism sheet. Accordingly, light can be irradiated in the left and right directions as well as the front direction.

BRIEF DESCRIPTION OF THE DRAWINGS

In the accompanying drawings:

FIG. 6 is a diagram for explaining the irradiation state of the backlight device according to the first embodiment of the invention;

FIGS. 26A and 26B are explanatory diagrams of display images of the transmission type display apparatus according to the eighth embodiment of the invention.

DETAILED DESCRIPTION OF THE INVENTION

First Embodiment

Figure 1:
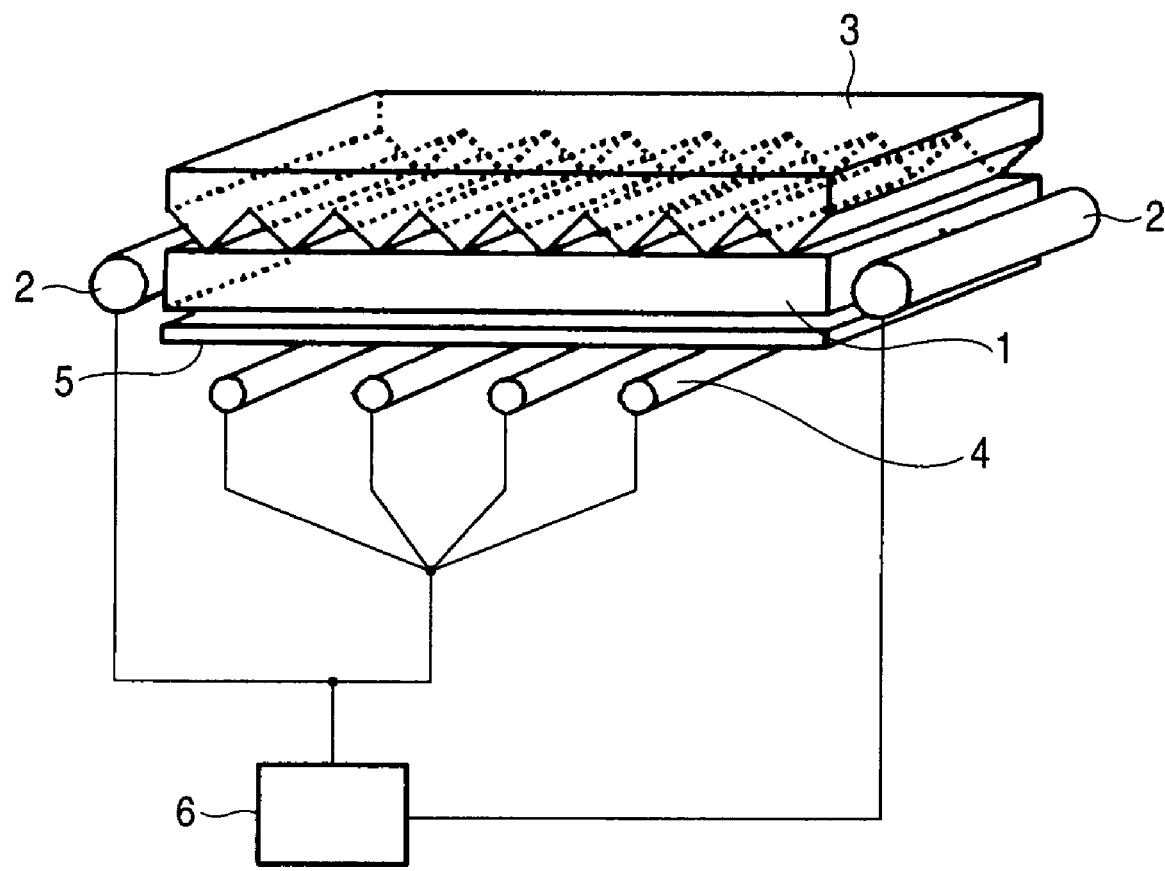
FIG. 1 is a perspective view of a backlight device according to the first embodiment of the invention.
Figure 2:
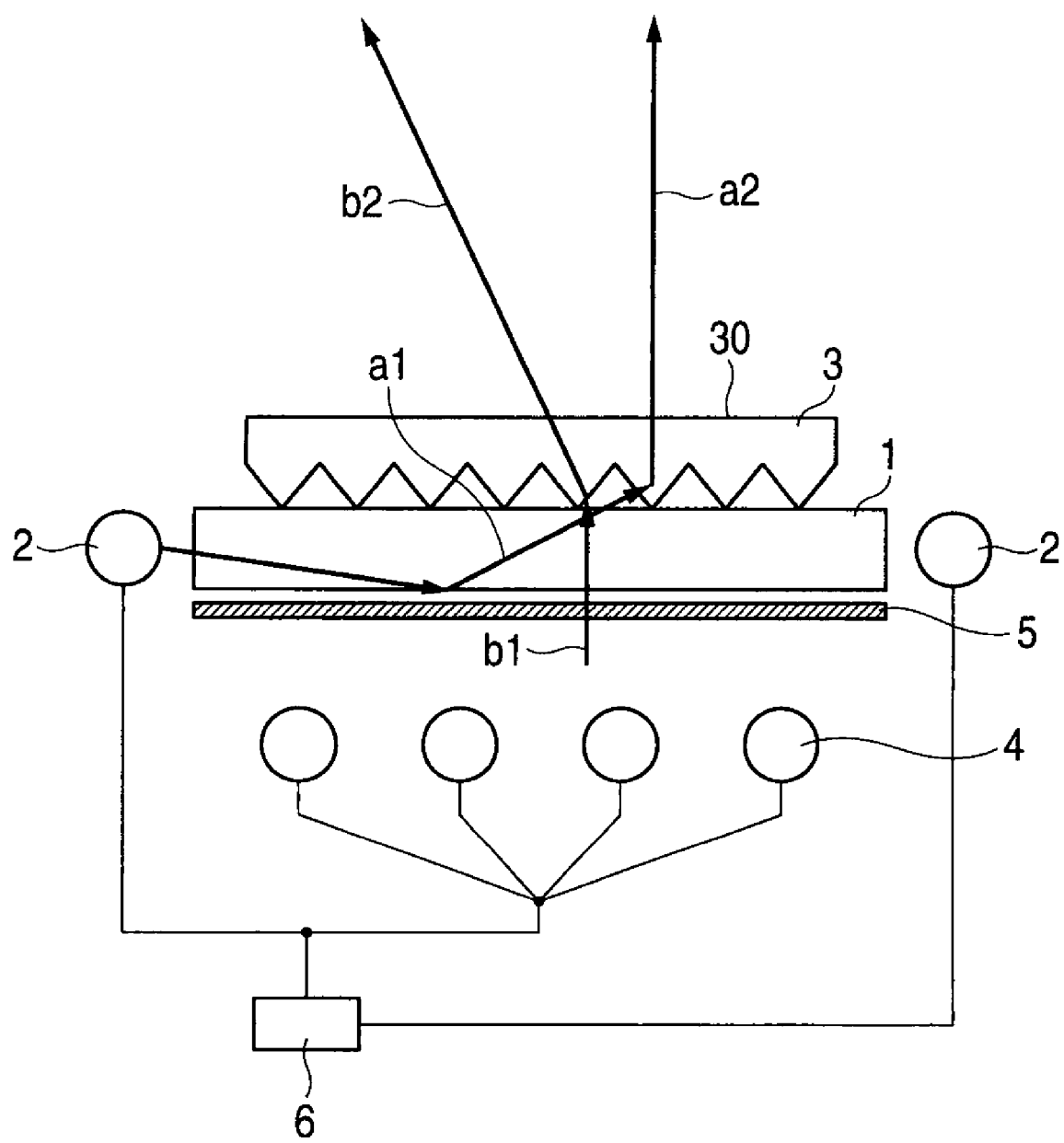
FIG. 2 is a diagram showing a transmission light path of light from a light source in FIG. 1.

FIG. 1 is a perspective view of a backlight device according to the first embodiment of the invention. FIG. 2 is a diagram showing a transmission light path of light from a light source in FIG. 1, which is shown by using a sectional diagram along a plane orthogonal to the ridge line direction of the triangular prism row of a prism sheet.

First light sources 2 are disposed at different two end surface sides of a first light guide plate 1, respectively, a first prism sheet 3 is provided at the light extracting side (light outgoing side) of the first light guide plate 1, and second light sources 4 are disposed via a view angle adjusting film 5 on one major surface side of the first light guide plate 1 which is in opposite to the first prism sheet 3 side. Further, a light source control portion 6 is provided so as to adjust the luminance of lights from each of the first light sources 2 and the second light sources 4 and change-over the blinking of these light sources.

Usually, an LED or a lamp is used for the first light source 2 according to the embodiment. The lights emitted from the first light sources enter into the end surfaces of the first light guide plate 1. A surface light source such as an electroluminescence as well as an LED or a lamp is used for the second light source 4 according to the embodiment. The lights emitted from the second light sources enter into the major surface of the first light guide plate 1.

The number of each of the first light source 2 and the second light source 4 may be one. However, like this embodiment, when the first light sources 2 are disposed at the different two end surface sides of the first light guide plate 1, respectively, and a plurality of the second light sources 4 are disposed, the luminance within the backlight surface can be uniformed and the distribution light angle distribution of irradiation lights can be made symmetric.

The first light guide plate 1 according to the embodiment has a rectangular shape in each of its side surfaces and has a flat plate shape as a whole. At least one of the upper and lower surfaces of the first light guide plate is provided with a concavo-convex prism or a grain formed by a slanted surface having a small tilt angle of 5 degree or less for extracting lights. The light entered into the end surface of the first light guide plate 1 from the first light source propagates within the first light guide plate while repeating the total reflection and a part of the propagated light impinges on the irregular surface of the grain for extracting the light and so is emitted from the first light guide plate 1.

Further, the ridge line direction of the triangular prism row of the first prism sheet 3 according to the embodiment is set to be substantially in parallel to the incident end surface of the first light guide plate 1 for the light from the first light source 2. Accordingly, the light emitted from the first prism sheet 3 can be easily uniformed within the surface of the first prism sheet 3.

A light control film made by Sumitomo 3 M Ltd., for example, may be used as the view angle adjusting film 5 according to the embodiment, whereby the angular distribution of the lights emitted from the second light source 4 is made narrow thereby to control the directivity. According to the embodiment, since lights leaked in the downward direction from the first light guide plate 1 is absorbed by the view angle adjusting film 5, the leaked light is prevented from being stray light. Since an amount of the stray light is reduced, an amount of lights leaked in the left and right directions at the time of the turning-on of the first light source 2 can be reduced.

Further, the first prism sheet 3 according to the embodiment is formed by material having a refractive index 1.5, for example. In the first prism sheet, the triangular prism row which ridge lines extend in the direction in parallel to the end surfaces of the first light guide plate 1 is disposed on the one surface of the prism sheet so as to extend in the direction orthogonal to the drawing sheet, and the triangular prism row is provided on the one surface opposing to the first light guide plate 1. The lights emitted from the first and second light sources enter into the triangular prism row and is emitted from the light outgoing surface 30 of the first prism sheet 3 formed on the opposite side of the surface of the first prism sheet 3 facing to the first light guide plate 1.

Figure 3:
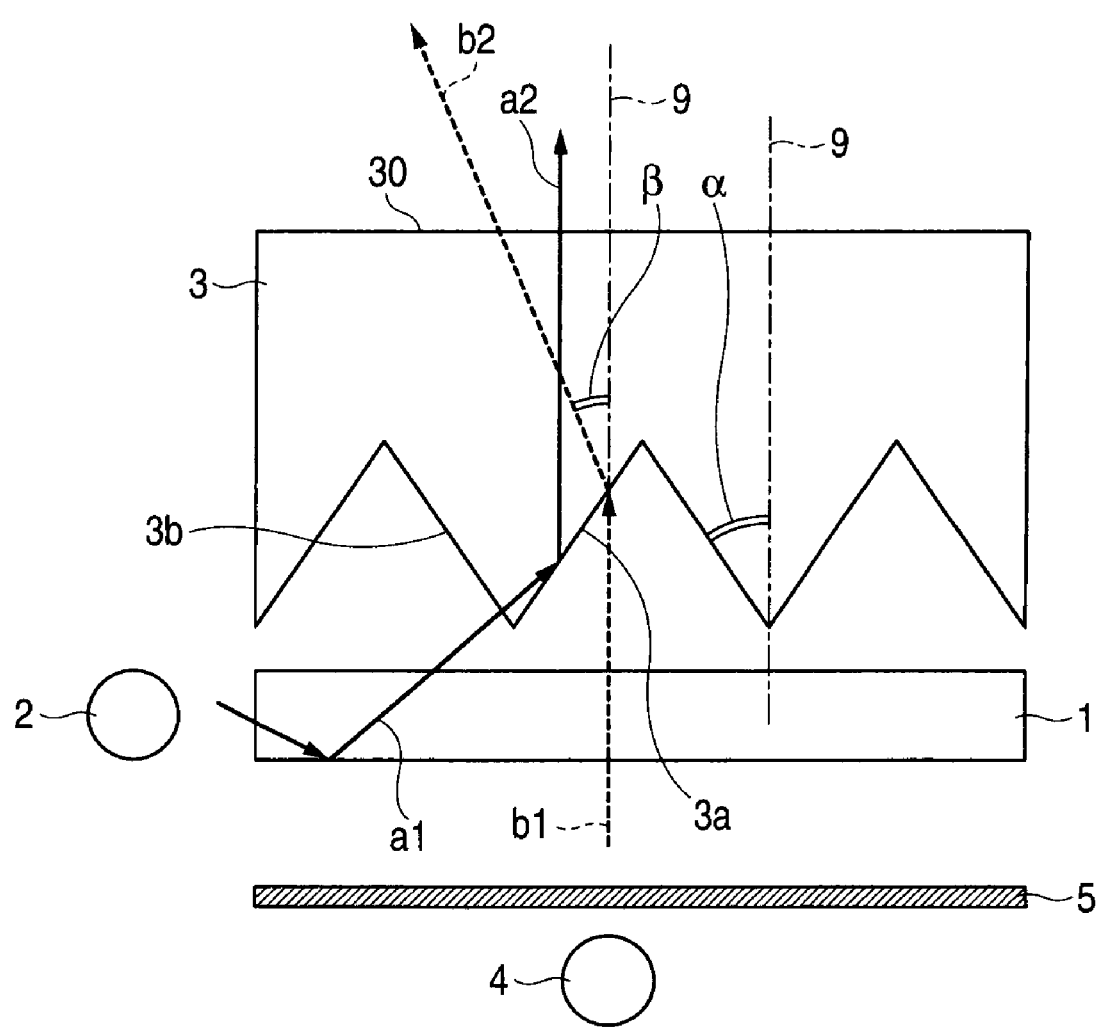
FIG. 3 is a diagram showing transmission light paths in a first prism sheet according to the first embodiment of the invention.

FIG. 3 is a diagram showing transmission light paths of the lights from the first and second light sources in the first prism sheet 3 according to the backlight device of the embodiment, which represents an example where the triangular prism row is formed by an isosceles triangle which apex angle is 60 degree.

As shown in FIG. 3, the light from the first light source 2 is emitted from the first light guide plate 1 as a light ray having directivity in a slanted direction with respect to the normal line direction of the light outgoing surface 30 of the first prism sheet 3 (hereinafter merely refereed as a normal line direction). A light ray a1 having the directivity in the slanted direction with respect to the normal line direction enters into the slanted surface 3$b$ of the triangular prism row of the first prism sheet 3, then is reflected by the slanted surface 3$a$ of the adjacent triangular prism, and emitted from the light outgoing surface 30 of the first prism sheet 3 as a light ray a2 having the directivity in the normal line direction, whereby the emitted light ray is irradiated in the front direction. Further, the light from the second light source 4 is controlled in its directivity by the view angle adjusting film 5 and is formed as a light ray b1 having the directivity in the normal line direction. The light ray b1 having the directivity in the normal line direction enters into the slanted surface 3$a$ of the triangular prism row of the first prism sheet 3. At this time, the light ray is refracted at the slanted surface 3$a$ and emitted from the light outgoing surface 30 of the first prism sheet 3 as a light ray b2 having the directivity in a slanted direction with respect to the normal line direction, whereby the emitted light rays are irradiated in the left and right directions.

Within the first prism sheet 3, the light ray b2 from the second light source 2 is refracted at the slanted surface 3$a$ of the triangular prism row when entering into this surface and propagates in a direction having an angle $\beta$ with respect to the normal line. In the case where a half of the apex angle of the triangular prism row of the first prism sheet 3 is $\alpha$, if $\beta \leq \alpha$, the light ray b2 can be irradiated in the left or right direction without being reflected by the slanted surface 3$b$ opposing to the slanted surface 3$a$ of the triangular prism row.

Figure 4A:
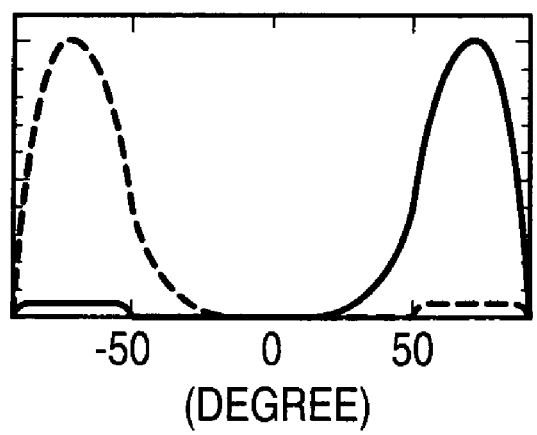
FIGS. 4A and 4B are characteristic diagrams showing angular distribution of incident light rays which are emitted from the first light sources and enters into the first prism sheet and angular distribution of outgoing light rays irradiated therefrom, according to the first embodiment of the invention.
Figure 4B:
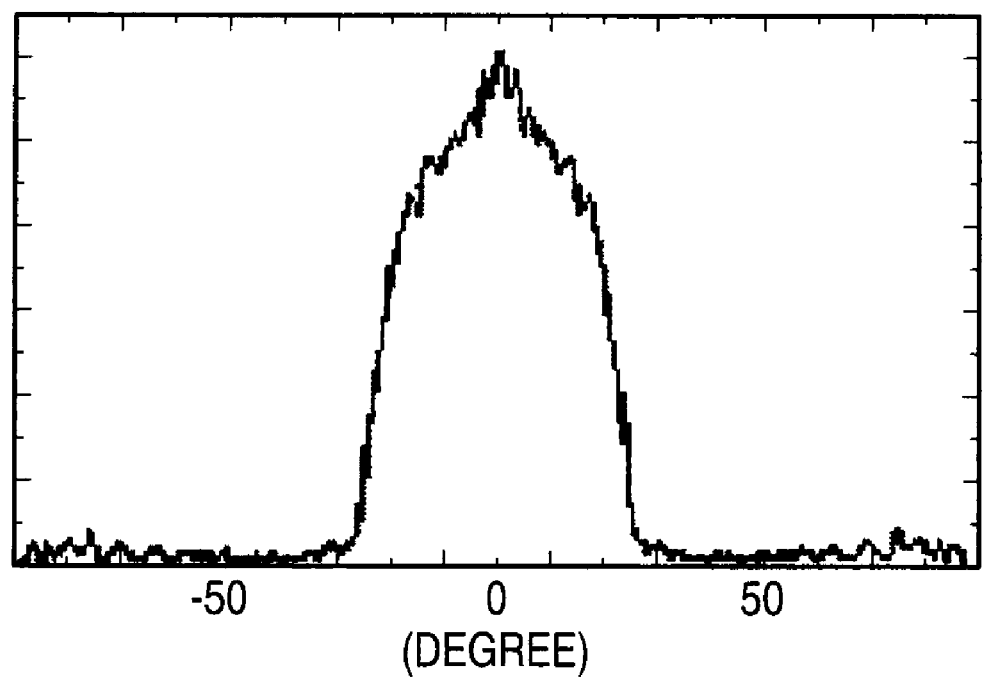

FIGS. 4A and 4B are characteristic diagrams showing simulation results in the case where, as shown in FIG. 2, the angular distribution of the incident light rays a1, which are emitted from the first light sources 2 and entered into the first prism sheet 3 via the first light guide plate 1, and the angular distribution of the outgoing light rays a2, when the incident light rays a1 are emitted from the first prism sheet 3 as these outgoing light rays, are simulated by the light ray locus tracking method based on the Monte Carlo method. In each of these figures, an abscissa represents an angle with respect to the normal line direction, wherein the left side and the right side with respect to the normal line direction in the drawing sheet of FIG. 2 are represented by minus and plus, respectively. Further, the ordinate in each of these figures represents the light intensity which unit is arbitrary.

FIG. 4A represents the angular distributions of the incident light rays a1 which are emitted from the first light sources 2 and entered into the first prism sheet 3. In the figure, the angular distribution shown by a steady line represents the angular distribution of the incident light from the first light source 2 on the left side of the drawing sheet of FIG. 2, whilst the angular distribution shown by a dotted line represents the angular distribution of the incident light from the first light source 2 on the right side of the drawing sheet. These angular distributions are bilaterally symmetrical to each other. That is, the light rays emitted from the left and right first light sources 2 are emitted from the first light guide plate and entered into the first prism sheet 3 as the light rays having the angular distribution in a range of 60 to 80 degrees with respect to the normal line direction and also as the light rays a1 having the angular distribution in a range of −60 to −80 degrees with respect to the normal line direction.

FIG. 4B is the angular distribution of the outgoing light rays a2 in the case where the incident light rays a1 entered into the first prism sheet 3 are emitted from the first prism sheet 3 as these outgoing light rays. This figure represents that the outgoing light rays have the angular distribution in a range of −20 to 20 degree with respect to the normal line direction and the outgoing light rays are converged in the normal line direction.

Figure 5A:
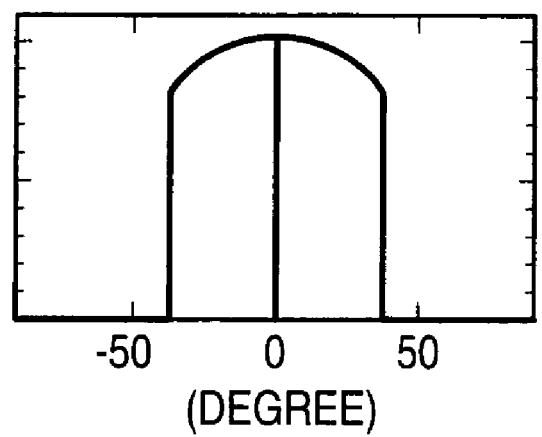
FIGS. 5A and 5B are characteristic diagrams showing angular distribution of incident light rays which are emitted from the second light sources and enters into the first prism sheet and angular distribution of outgoing light rays irradiated therefrom, according to the first embodiment of the invention.
Figure 5B:
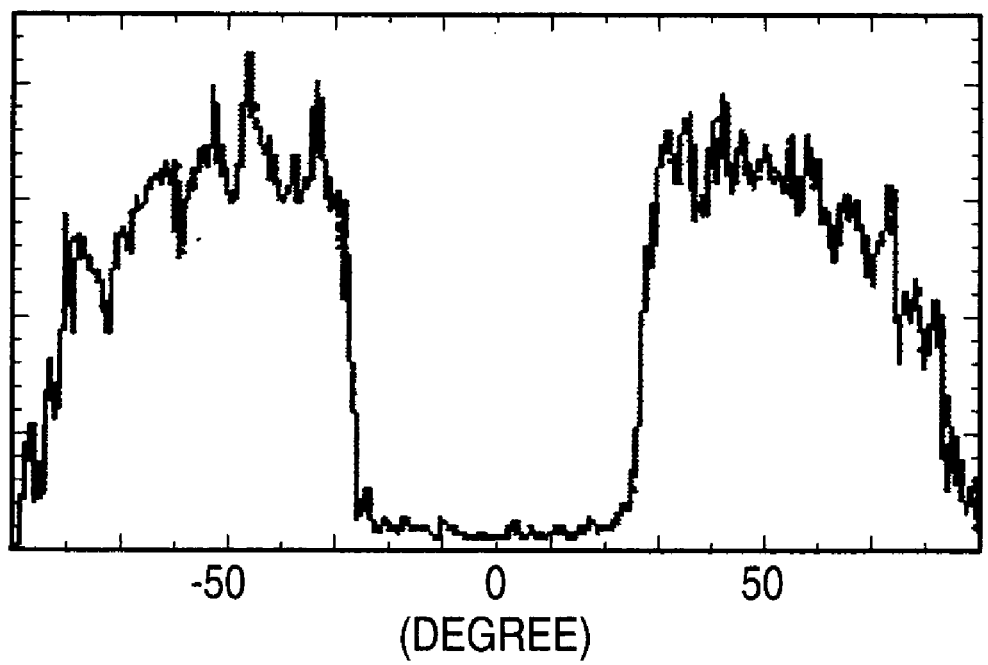

FIGS. 5A and 5B are characteristic diagrams showing simulation results in the case where, as shown in FIG. 2, the angular distribution of the incident light rays b1, which are emitted from the second light sources 4 and entered into the first prism sheet 3, and the angular distribution of the outgoing light rays b2, when the incident light rays b1 are emitted from the first prism sheet 3 as these outgoing light rays, are simulated by the light ray locus tracking method based on the Monte Carlo method. In each of these figures, an abscissa represents an angle with respect to the normal line direction, wherein the left side and the right side with respect to the normal line direction in the drawing sheet of FIG. 2 are represented by minus and plus, respectively. Further, the ordinate in each of these figures represents the light intensity which unit is arbitrary.

FIG. 5A represents the angular distributions of the incident light rays b1 which are emitted from the second light sources 4 and entered into the triangular prism row of the first prism sheet 3. For example, the incident light rays emitted from the second light sources are made narrow in their angular distribution into a range of −35 to 35 degree with respect to the normal line direction by the view angle adjusting film 5, whereby the directivity thereof is controlled in the normal line direction.

FIG. 5B is the angular distribution of the outgoing light rays b2 when the incident light rays b1 entered into the first prism sheet 3 are emitted from the first prism sheet 3 as these outgoing light rays. This figure represents that the outgoing light rays do not emit in the normal line direction but emit to the left and right directions in a distributed manner so as to have the angular distribution in a range of −30 degree or less and 30 degree or more with respect to the normal line direction.

FIG. 6 is a diagram for explaining the irradiation state of the backlight device according to the embodiment. The light emitted from the backlight device 10 is irradiated on a viewer side. Supposing that, in the case where a viewer exists just in front of the backlight device, the distance between the left eye 8a and the right eye 8b is about 65 mm and the visual distance from the light outgoing surface 30 of the first prism sheet 3 to the viewer is about 300 mm, an angle 9a between the normal line direction 9 from the center of the light outgoing surface 30 and a straight line extending from the center of the light outgoing surface to the left eye 8a or the right eye 8b is about 6 degree. When one of the eyes of the viewer locates just in front of the light outgoing surface, the other eye locates at an angle of about −12 degree or 12 degree with respect to the normal line direction.

Thus, the front direction in this specification means an angular range including an angular range of 12 degree to the left and right directions with respect to the normal line direction from the light outgoing surface 30, that is, an angular range between −12 degree and +12 degree with respect to the normal line direction from the light outgoing surface 30. An angular range other than the front direction is defined as left and right directions.

As described above, in this embodiment, since the light rays with the angular distribution shown in FIG. 4A are converged so as to have the angular range between −20 degree and +20 degree with respect to the normal line direction from the first prism sheet 3, the converged light rays sufficiently include the light rays within the angular range (the range between −12 degree and +12 degree with respect to the normal line direction) which can be recognized by a viewer existing in the front direction. Thus, the first light sources 2 can irradiate in the front direction.

Further, since the light rays with the angular distribution shown in FIG. 5A are bent by the first prism sheet 3 so as to have the angular distribution in a range of −30 degree or less and 30 degree or more with respect to the normal line direction, the bent light rays propagate outside the angular range (the range between −12 degree and +12 degree with respect to the normal line direction) which can be recognized by a viewer existing in the front direction. Thus, the second light sources 4 can irradiate the left and right directions.

Second Embodiment

Simulation is made, in the similar manner as the first embodiment, as to the angular distributions of respective outgoing lights in the case where the light rays from the first and second light sources are emitted from the first prism sheet 3, in a manner by using the first prism sheet 3 having the triangular prism row in which the apex angle of each of the triangular prisms is set to 70, 65, 60 or 55 degree and also by using, as the incident light rays b1 entering into the first prism sheet 3 from the second light sources 4, light rays having the directivity in the normal line direction and also having the angular distribution in a range of −35 to 35 degree with respect to the normal line direction, that is, the angular distribution with an angular width of 70 degree around the normal line direction.

FIGS. 7A to 10B are diagrams showing the simulation results of the angular distributions of the respective outgoing light rays b2 emitted from the first prism sheet 3, that is, the angular distributions of the irradiation light rays of the backlight device according to this embodiment, in the case of using the first prism sheet 3 having the triangular prism row in which the apex angles of the triangular prisms are set to have the aforesaid different values. Each of FIGS. 7A, 8A, 9A and 10A represents a simulation result of the angular distribution of the outgoing right rays a2 in the case where the incident light rays from the first light sources 2 are entered into the first prism sheet 3 and emitted therefrom as these outgoing light rays, and each of FIGS. 7B, 8B, 9B and 10B represents a simulation result of the angular distribution of the outgoing right rays b2 in the case where the incident light rays from the second light sources 4 are entered into the first prism sheet 3 and emitted therefrom as these outgoing light rays.

Figure 7A:
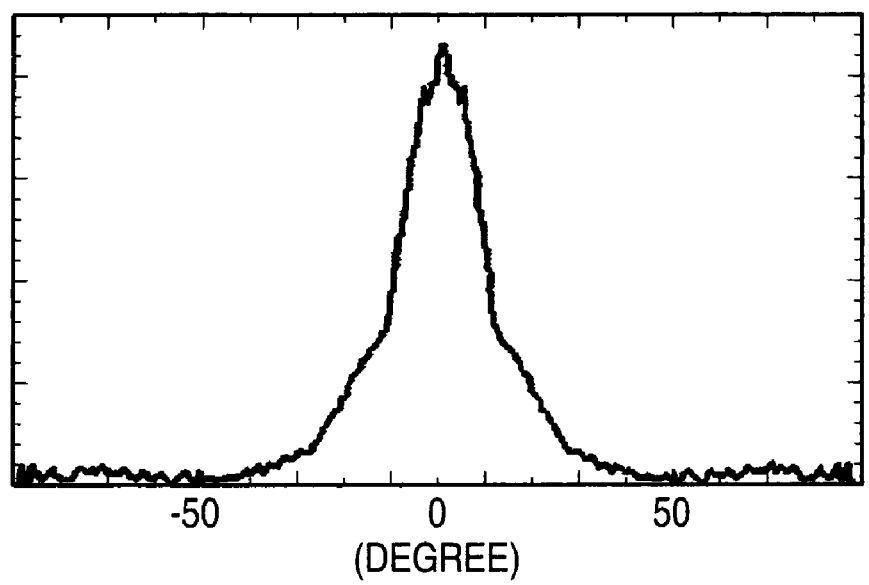
FIGS. 7A and 7B are characteristic diagrams showing angular distributions of irradiation light of the backlight device according to the second embodiment of the invention.
Figure 7B:
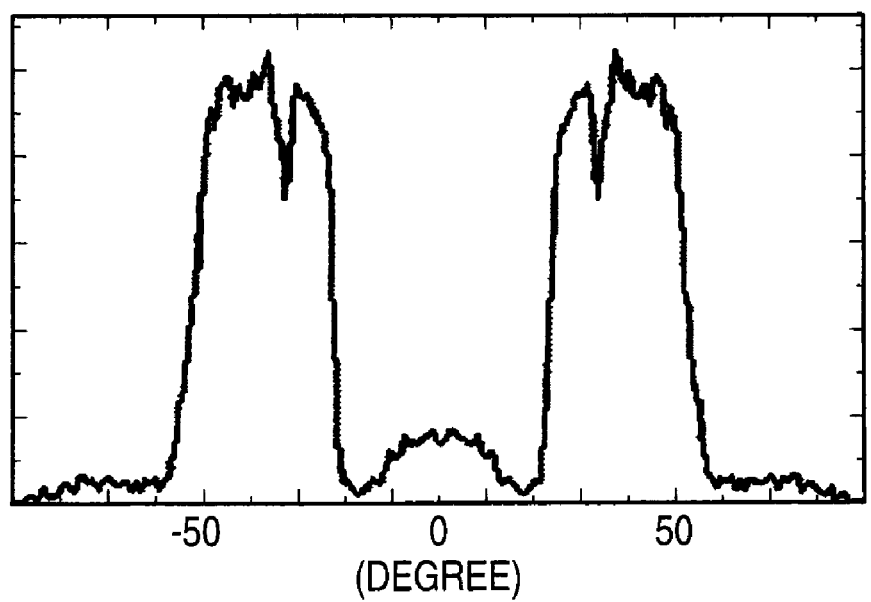
Figure 8A:
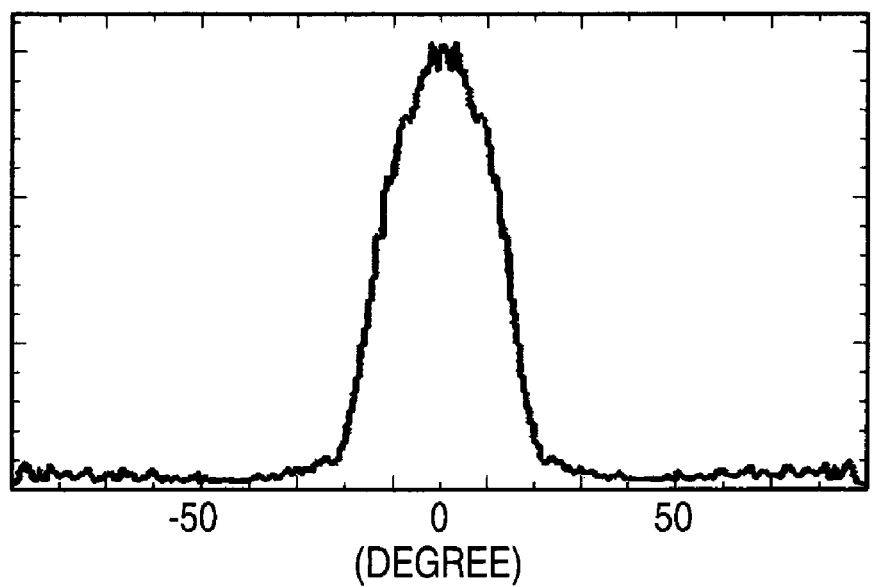
FIGS. 8A and 8B are characteristic diagrams showing angular distributions of irradiation light of the backlight device according to the second embodiment of the invention.
Figure 8B:
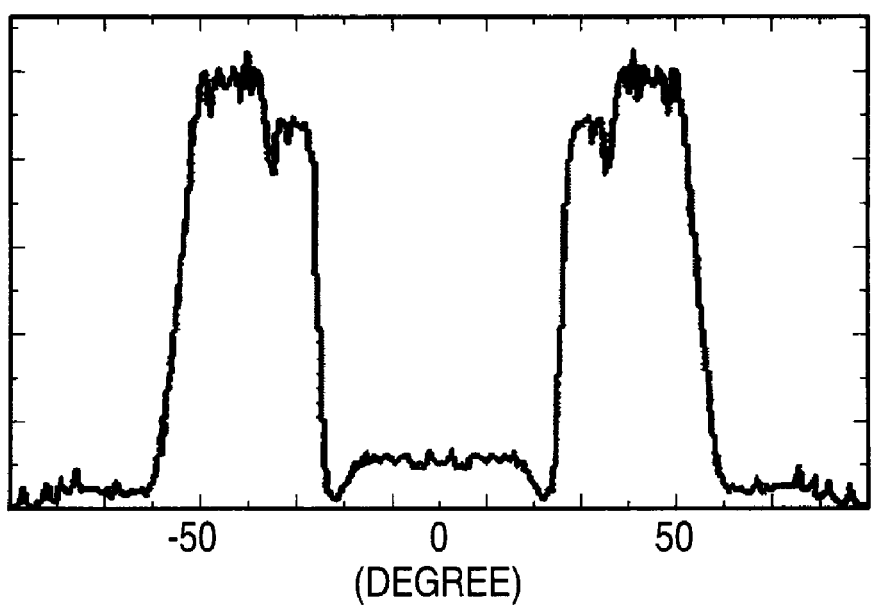
Figure 9A:
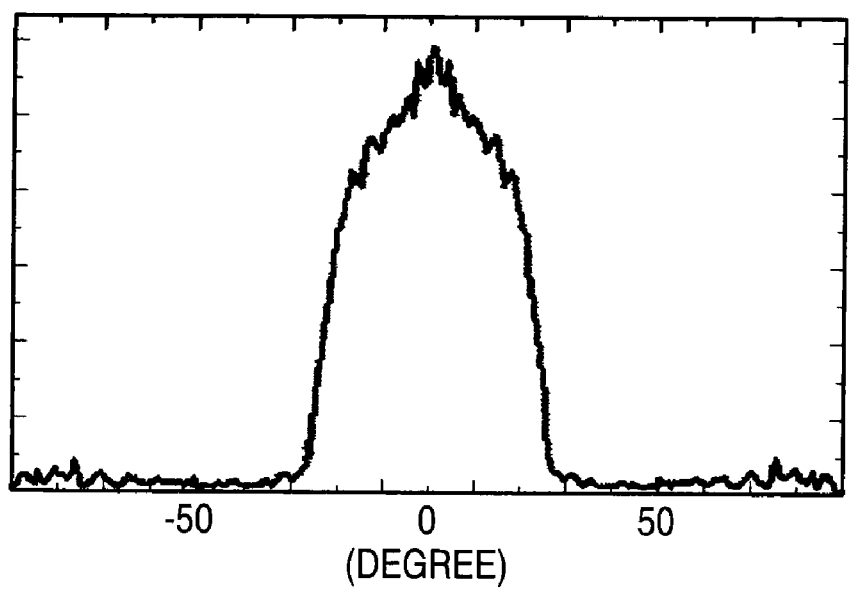
FIGS. 9A and 9B are characteristic diagrams showing angular distributions of irradiation light of the backlight device according to the second embodiment of the invention.
Figure 9B:
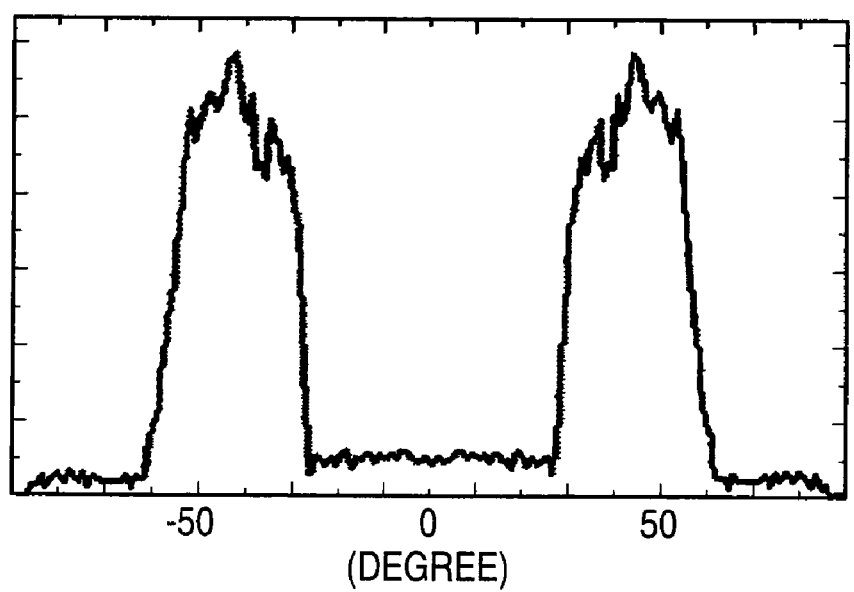
Figure 10A:
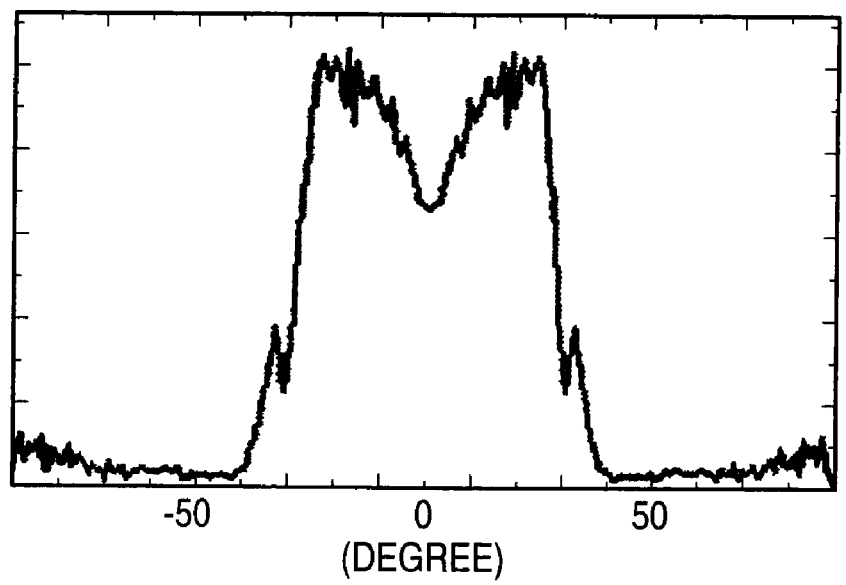
FIGS. 10A and 10B are characteristic diagrams showing angular distributions of irradiation light of the backlight device according to the second embodiment of the invention.
Figure 10B:
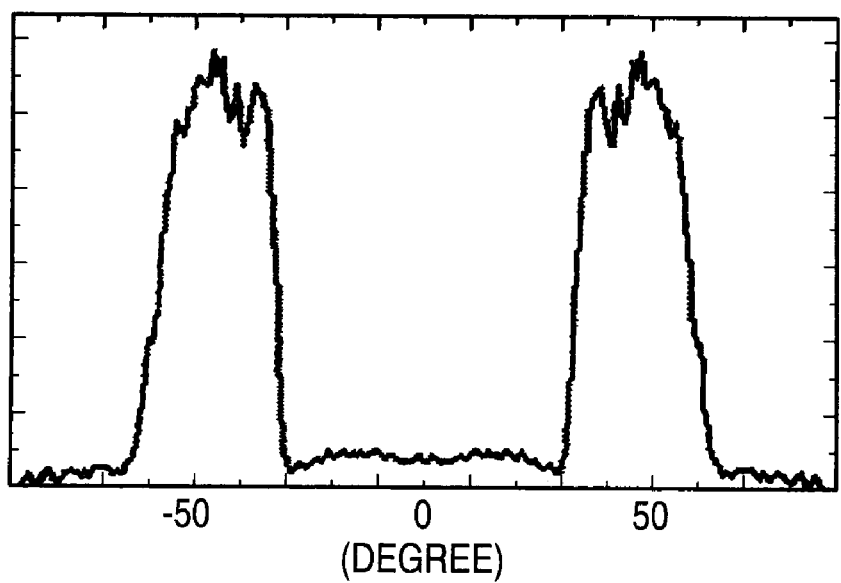

In the case where the apex angle of each of the triangular prisms of the triangular prism row is set to 70 degree, as shown in FIG. 7A, the irradiation light rays in the front direction have the angular distribution in a range of −10 to 10 degree with respect to the normal line direction and the width of this angular distribution is narrow. In contrast, as shown in FIG. 7B, the irradiation light rays in the left and right directions have the angular distribution in a range of −20 or less and 20 or more. Thus, each of the angular ranges between −20 to −10 degree and between 10 to 20 degree becomes dark angular ranges in which both the light rays in the front direction and the left and right directions can be seen hardly and so a viewer feels difficulty in usability.

In the case where the apex angle of each of the triangular prisms is set to 65 degree (see FIGS. 8A and 8B) or 60 degree (see FIGS. 9A and 9B), the aforesaid dark angular ranges become narrow. However, when the apex angle of each of the triangular prisms of the triangular prism row is set to 55 degree (see FIGS. 10A and 10B), there arises a luminance valley portion in the front direction and so there appears a dark line portion in the front direction.

As described above, it will be clear that the apex angle of each of the triangular prisms of the first prism sheet 3 is preferably in a range of 60 to 65 degree.

Third Embodiment

Simulation is made, in the similar manner as the first embodiment, as to the angular distributions of respective outgoing light rays b2 in the case where the incident light rays b1 respectively having the following angular distributions are emitted from the first prism sheet 3 as the outgoing light rays, in a manner by using the first prism sheet 3 having the triangular prism row in which the apex angle of each of the triangular prisms is set to 60 degree and also by using, as the incident light rays b1 entering into the first prism sheet 3 from the second light sources 4, light rays having the directivity in the normal line direction and also having the angular distribution in a range of −20 to 20 degree, −30 to 30 degree, −35 to 35 degree, −40 to 40 degree, −45 to 45 degree or −50 to 50 degree with respect to the normal line direction, that is, the angular distribution with an angular width of 40 degree, 60 degree, 70 degree, 80 degree, 90 degree or 100 degree around the normal line direction.

FIGS. 11A to 16B are diagrams showing the simulation results of the angular distributions of the respective outgoing light rays b2 when the incident light rays b1 having the aforesaid different angular distributions are emitted from the first prism sheet 3 as the outgoing light rays. Each of FIGS. 11A, 12A, 13A, 14A, 15A and 16A represents a simulation result of the angular distribution of the incident light rays b1 which enter into the triangular prism row of the first prism sheet 3 from the second light sources 4, and each of FIGS. 11B, 12B, 13B, 14B, 15B and 16B represents a simulation result of the angular distribution of the outgoing right rays b2 in the case where the incident light rays b1 entered into the first prism sheet 3 are emitted from the first prism sheet 3 as these outgoing light rays.

Figure 11A:
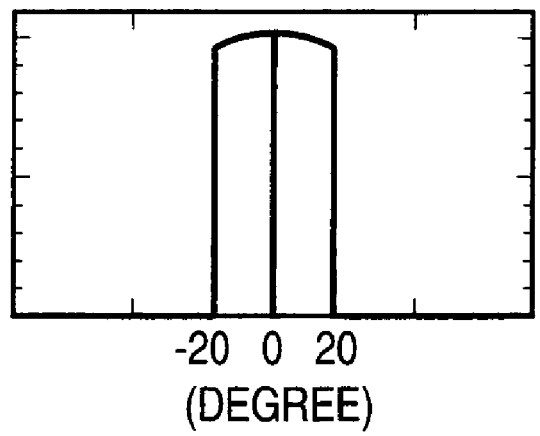
FIGS. 11A and 11B are characteristic diagrams showing angular distributions of light emitted from second light sources of the backlight device according to the third embodiment of the invention.
Figure 11B:
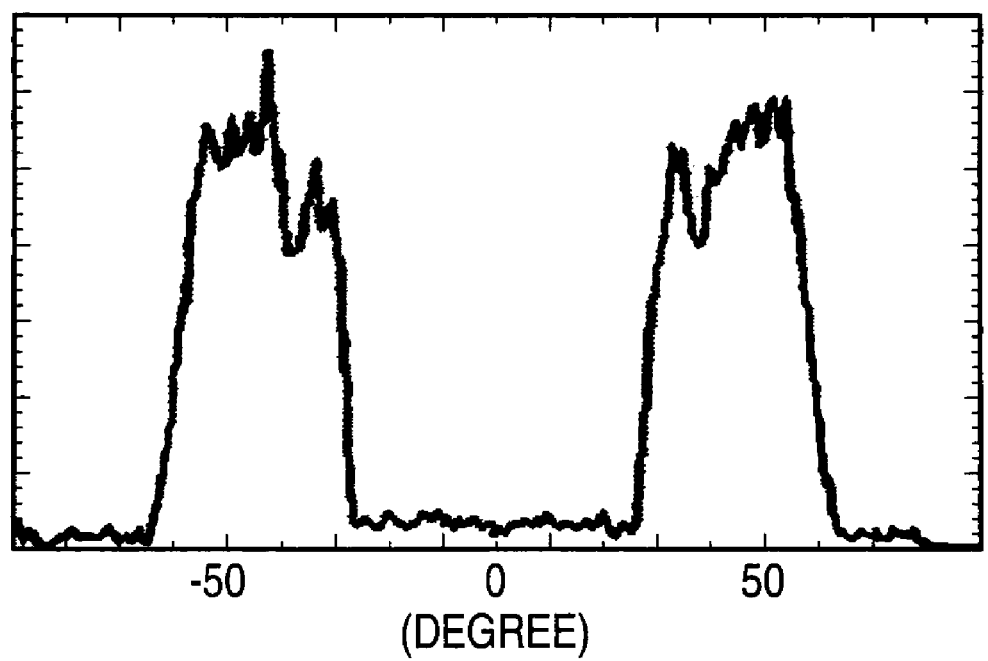
Figure 15A:
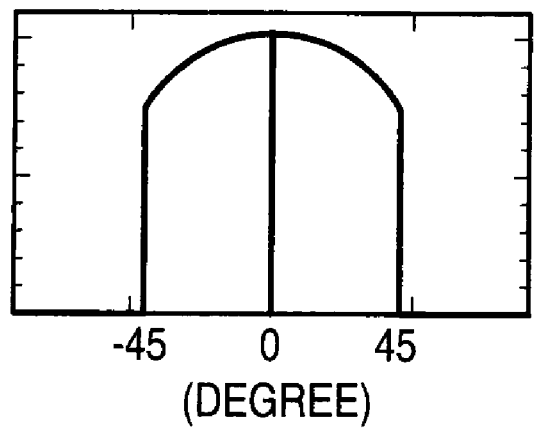
FIGS. 15A and 15B are characteristic diagrams showing angular distributions of light emitted from the second light sources of the backlight device according to the third embodiment of the invention.
Figure 15B:
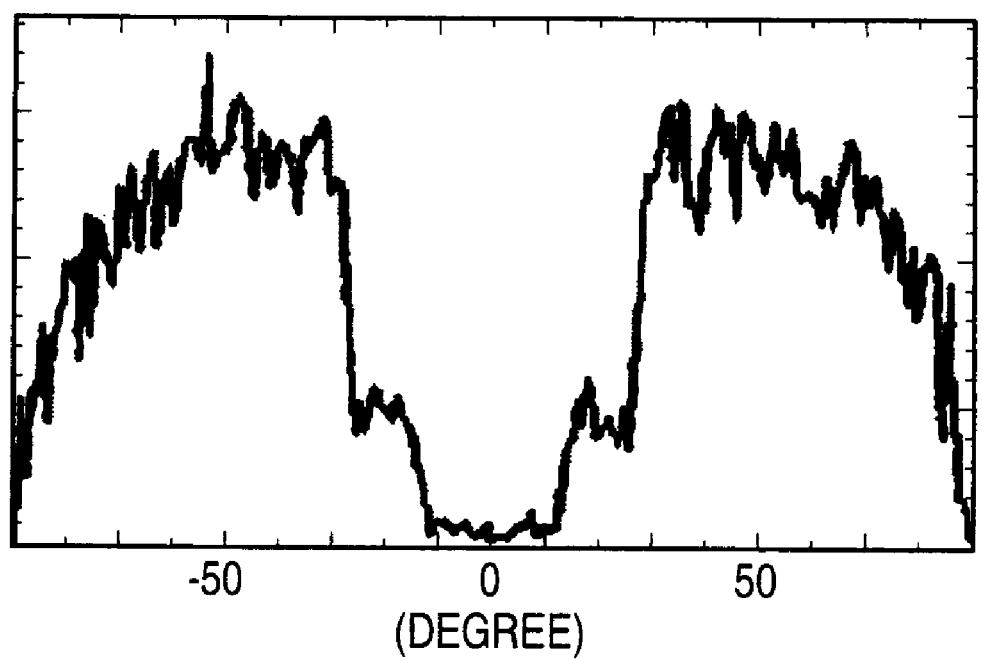
Figure 16A:
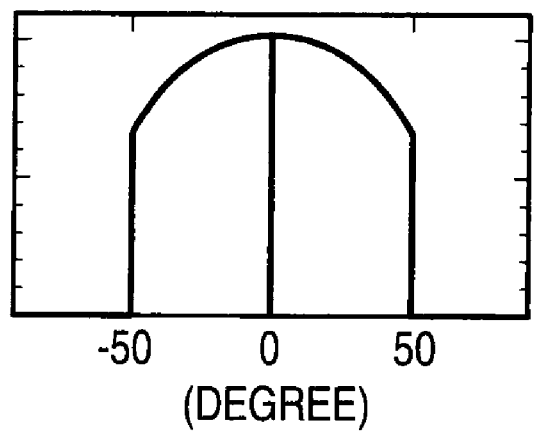
FIGS. 16A and 16B are characteristic diagrams showing angular distributions of light emitted from the second light sources of the backlight device according to the third embodiment of the invention.
Figure 16B:
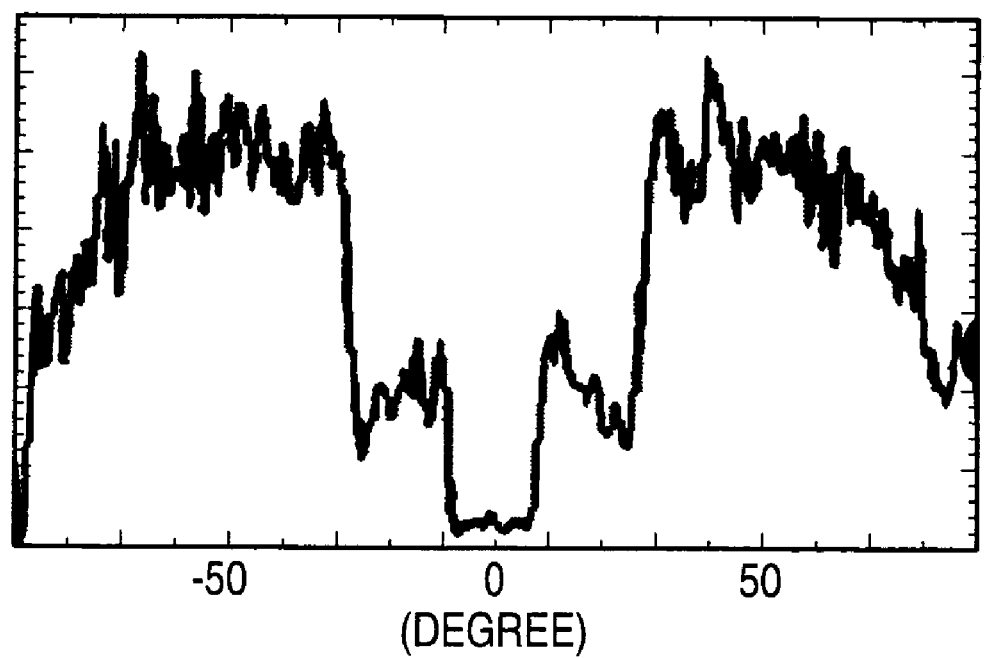

As shown in FIGS. 15A and 15B (angular distribution in a range of −45 to 45 degree) and FIGS. 16A and 16B (angular distribution in a range of −50 to 50 degree), when the angular distribution of the incident light rays b1 entered into the first prism sheet 3 from the second light sources 4 spreads more than the range of −45 to 45 degree with respect to the normal line direction, the leakage of the outgoing right rays b2 from the first prism sheet 3 increases in the front direction. In contrast, as shown in FIGS. 11A and 11B, when the angular distribution of the incident light rays b1 entered into the first prism sheet 3 from the second light sources 4 is small like less than the range of −20 to 20 degree, the range of the angular distribution of the outgoing right rays b2 from the first prism sheet 3 also becomes small. Thus, since the luminance in the slanted directions of −60 degree or less and 60 degree or more reduces, an amount of the irradiation lights in the left and right directions is small and an illumination range becomes small.

Figure 12A:
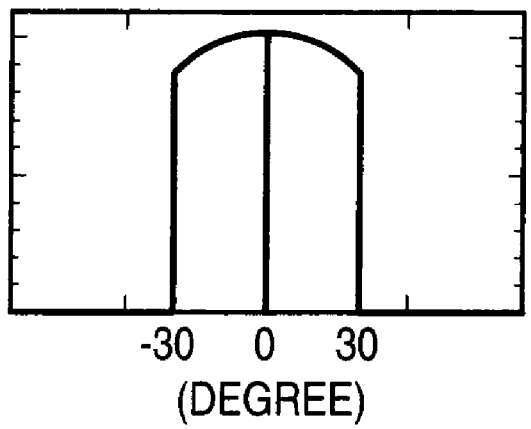
FIGS. 12A and 12B are characteristic diagrams showing angular distributions of light emitted from the second light sources of the backlight device according to the third embodiment of the invention.
Figure 12B:
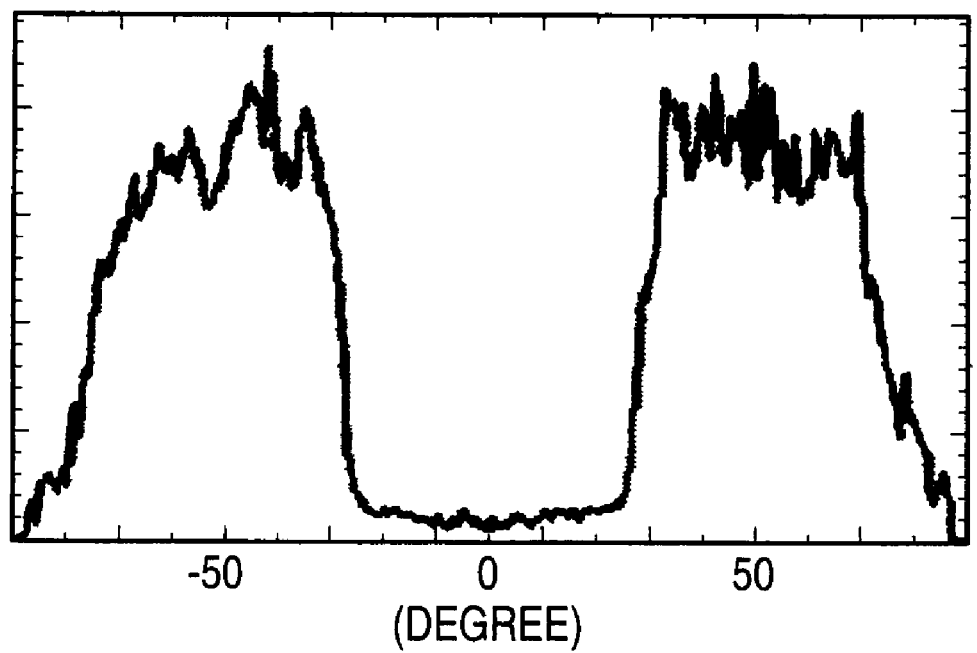
Figure 13A:
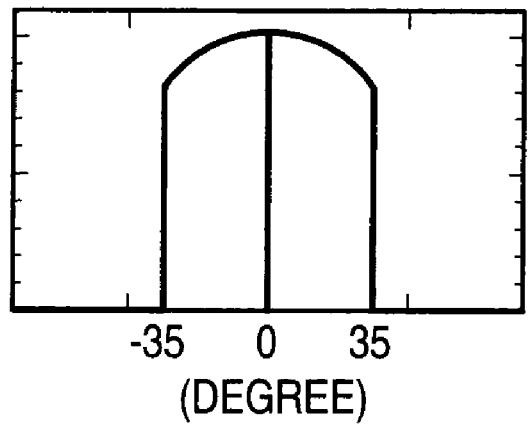
FIGS. 13A and 13B are characteristic diagrams showing angular distributions of light emitted from the second light sources of the backlight device according to the third embodiment of the invention.
Figure 13B:
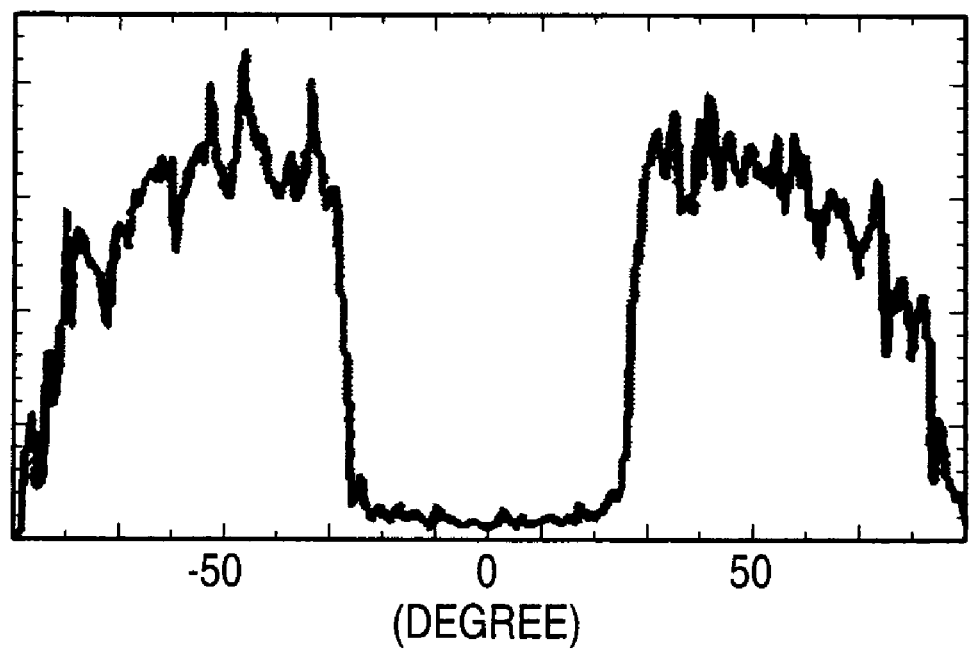
Figure 14A:
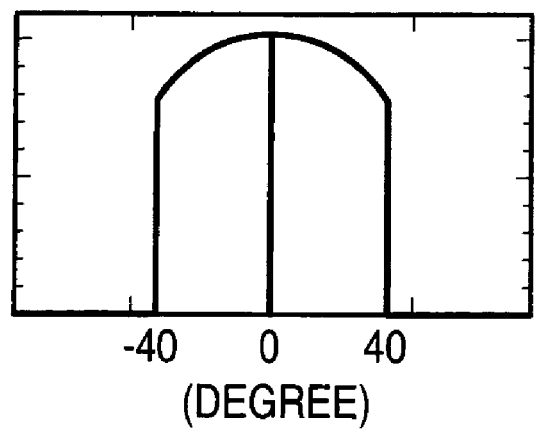
FIGS. 14A and 14B are characteristic diagrams showing angular distributions of light emitted from the second light sources of the backlight device according to the third embodiment of the invention.
Figure 14B:
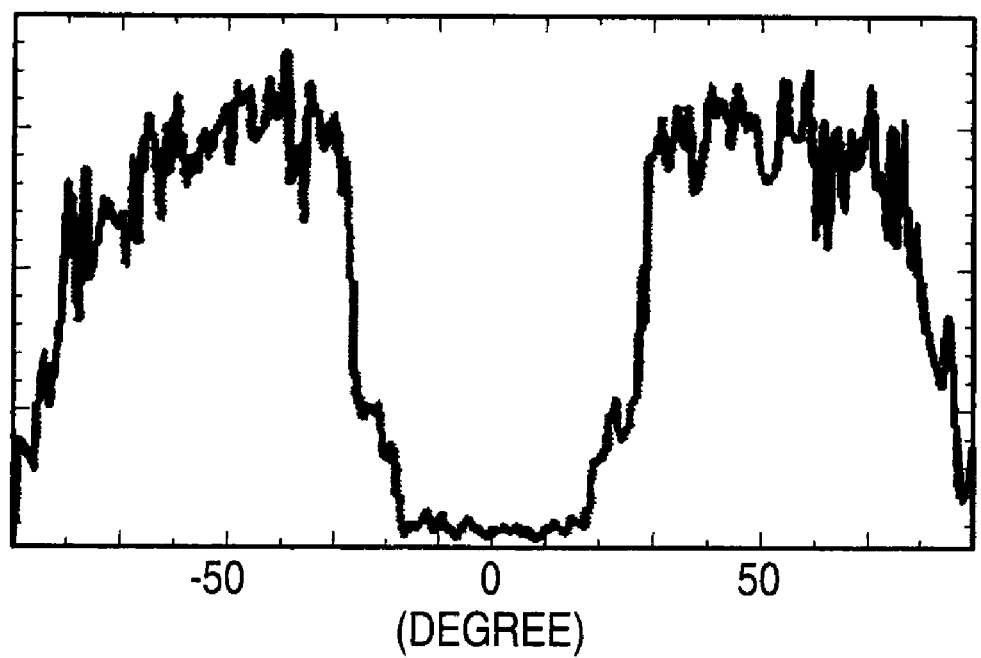

Therefore, as shown in FIGS. 12A and 12B (angular distribution in a range of −30 to 30 degree), FIGS. 13A and 13B (angular distribution in a range of −35 to 35 degree) and FIGS. 14A and 14B (angular distribution in a range of −40 to 40 degree), it will be understood that light rays having the angular distribution with an angular width of 60 to 80 degree around the normal line direction are preferable as the angular distribution of the incident light rays b1 entered into the triangular prism row of the first prism sheet 3 from the second light sources 4. The light rays with such an angular distribution can be obtained by suitably combining a diffusion film and a view angle adjusting film.

Fourth Embodiment

The backlight device according to the fourth embodiment of the invention is arranged in a manner that in place of entering the light rays from the second light sources 4 into the first prism sheet 3 via the view angle adjusting film 5 so as to obtain the light rays having the directivity in the normal line direction in the first embodiment, the light rays from the second light sources are extracted via a prism sheet as light rays having the directivity in the normal line direction.

Figure 17:
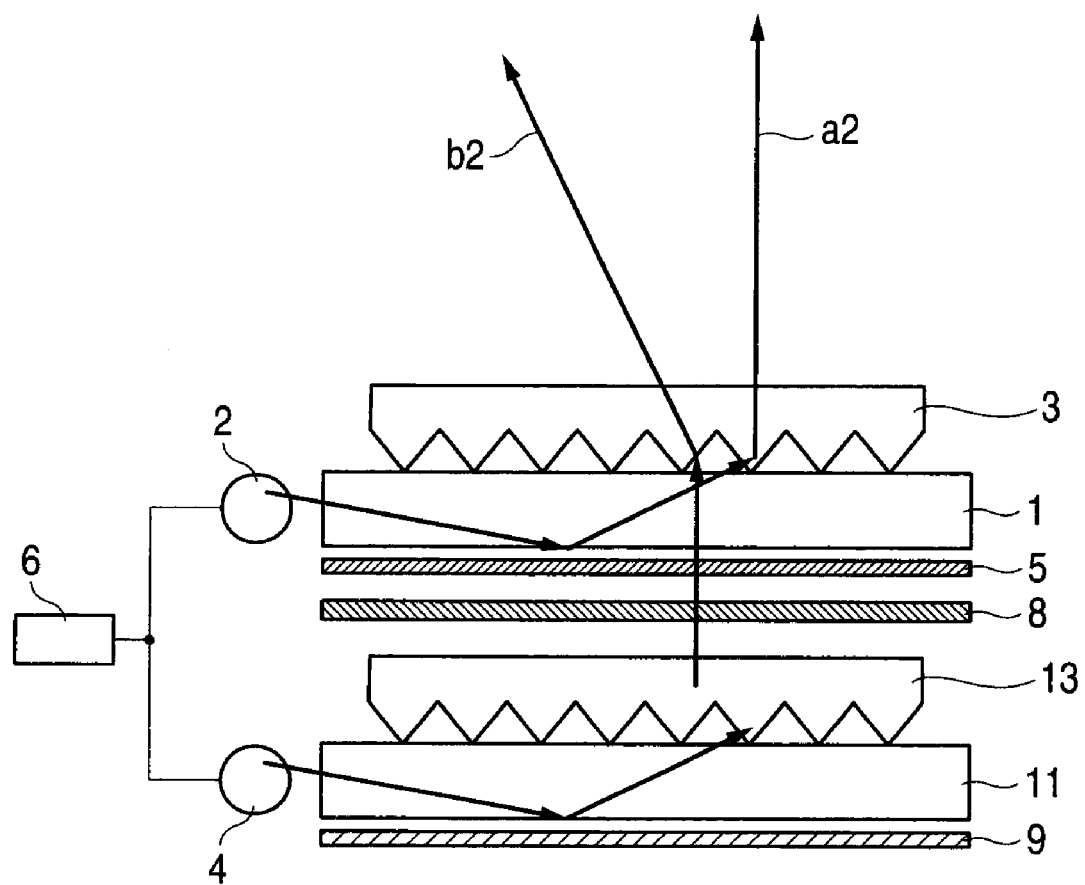
FIG. 17 is a diagram showing the configuration of the backlight device according to the fourth embodiment of the invention.

FIG. 17 is a diagram showing the configuration of the backlight device according to the fourth embodiment of the invention.

Unlike the backlight device according to the first embodiment, a second prism sheet is provided via the view angle adjusting film 5 and a diffusion sheet 8 on one major surface side of the first light guide plate 1 which is in opposite to the first prism sheet side. A second light guide plate is provided on one major surface side of the second prism sheet in opposite to the first light guide plate. The second light sources 4 are disposed at the end surface sides of the second light guide plate 11 and a reflection sheet 9 is provided on one major surface side of the second light guide plate 11 in opposite to the second prism sheet 13 side.

In the backlight device according to this embodiment, the light emitted from the first light source 2 propagates within the first light guide plate 1 while repeating the total reflection, then emits from the first light guide plate 1, then is reflected by the slanted surface of the triangular prism row of the first prism sheet 3 and is irradiated in the front direction. Further, the light emitted from the second light source 4 also propagates within the second light guide plate in the similar manner, then is reflected by the slanted surface of the triangular prism row of the second prism sheet 13, then irradiated in the front direction, then the outgoing light having the directivity in the normal line direction enters into the triangular prism row of the first prism sheet 3 and emits in the left and right directions from the first prism sheet 3 like the first embodiment.

The apex angle of each of the triangular prisms of the first and second prism sheets in the backlight device according to the embodiment is 60 degree. Further, the simulation results of the angular distributions of the incident light rays entered into the first prism sheet 3 and the outgoing light rays emitted from the first prism sheet 3 are same as those of FIGS. 4 and 5.

In this embodiment, since the right rays having the excellent directivity are emitted in the normal line direction from the second prism sheet 13, advantageously, an amount of light rays absorbed by the view angle adjusting film 5 becomes small and so the luminance efficiency is high.

Fifth Embodiment

Figure 18:
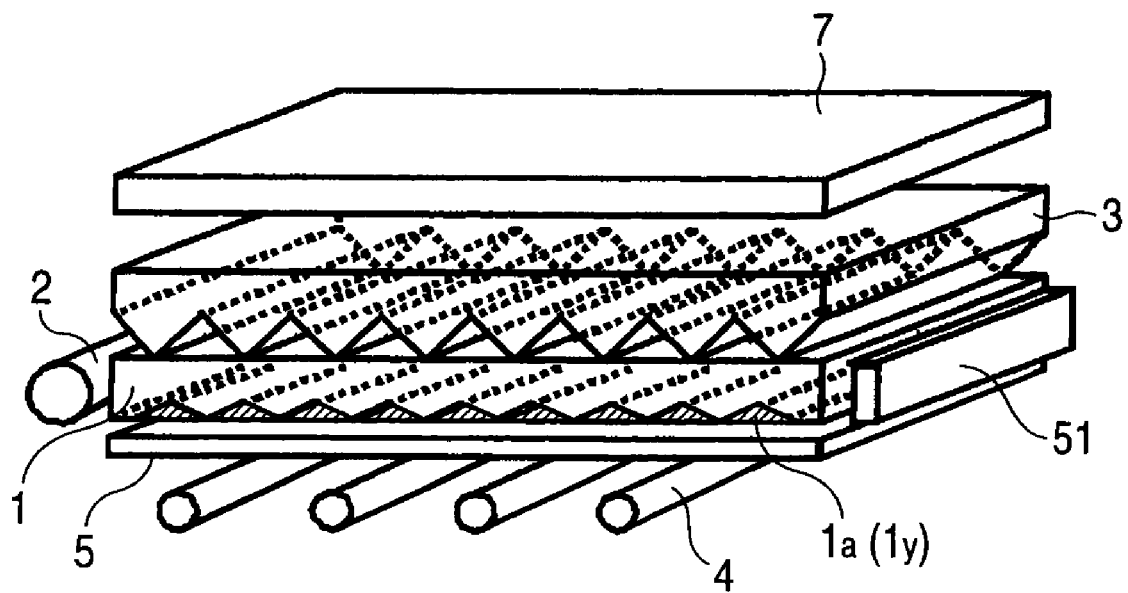
FIG. 18 is a perspective view of the backlight device according to the fifth embodiment of the invention and a transmission type display apparatus using the device.
Figure 19:
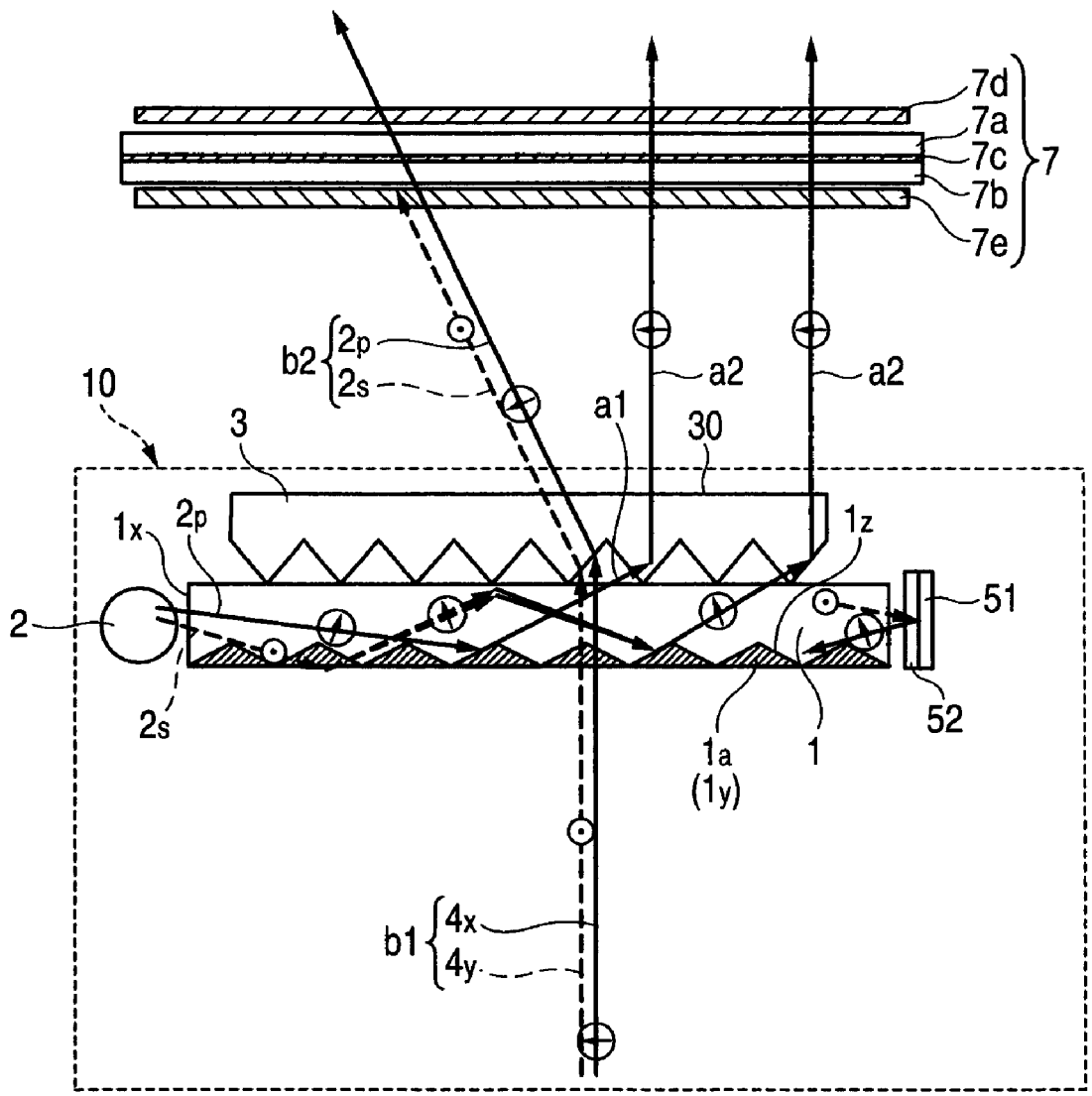
FIG. 19 is a diagram for explaining a transmission light path of the backlight device of FIG. 18 and the transmission light state of a transmission type panel.

FIG. 18 is a perspective view of a backlight device according to the fifth embodiment of the invention and a transmission type display apparatus using the device. FIG. 19 is a diagram for explaining a transmission light path of the backlight device of FIG. 18 and the transmission light state of the transmission type panel. This figure is shown by using a sectional diagram along a plane orthogonal to the longitudinal direction of a groove row provided at the first light guide plate.

The backlight device 10 according to the embodiment is same as the first embodiment except that the first light guide plate 1 includes a groove row 1y formed on one major surface thereof in opposite to the first prism sheet 3 side and an optical member 1a having optical anisotropy is adhered to the groove surfaces 1z of the groove row 1y.

To be more concrete, the groove row 1y is provided continuously on the one major surface of the first light guide plate 1 according to the embodiment, the longitudinal direction of the groove row 1y is almost in parallel to the light incident end surfaces 1x for the light from the first light source 2 of the first light guide plate 1 and the ridge line direction of the triangular prism row of the first prism sheet 3. The optical member 1a is formed by filling liquid crystal material having optical anisotropy into the groove row 1y, whereby the optical member has the optical anisotropy and is adhered to the groove surfaces 1z of the groove row 1y.

For example, the first light guide plate 1 according to the embodiment is fabricated by using acrylic resin (having a refractive index of 1.49) and the optical member 1a according to the embodiment is fabricated by using liquid crystal material having the optical anisotropy and ultraviolet curing property (having a refractive index of 1.5 in the major axis direction and a refractive index of 1.7 in the minor axis direction) in the following manners. In this respect, as described above, the one refractive index of the liquid crystal material forming the optical member 1a is almost same as the refractive index of the first light guide plate 1.

First, the first light guide plate 1 is formed by the molding injection using the acrylic resin so as to have, on its one major surface, the groove row 1y which longitudinal direction is almost in parallel to the light incident end surfaces 1x for the light from the first light source 2 and the surface of the groove row 1y is provided with an orientation film or subjected to the rubbing processing according to need.

Next, the liquid crystal material having the optical anisotropy is coated on the one major surface of the first light guide plate 1 so as to fill the groove row 1y and is cured by being applied with ultraviolet rays, whereby the optical member 1a having the optical anisotropy is formed.

Figure 20:
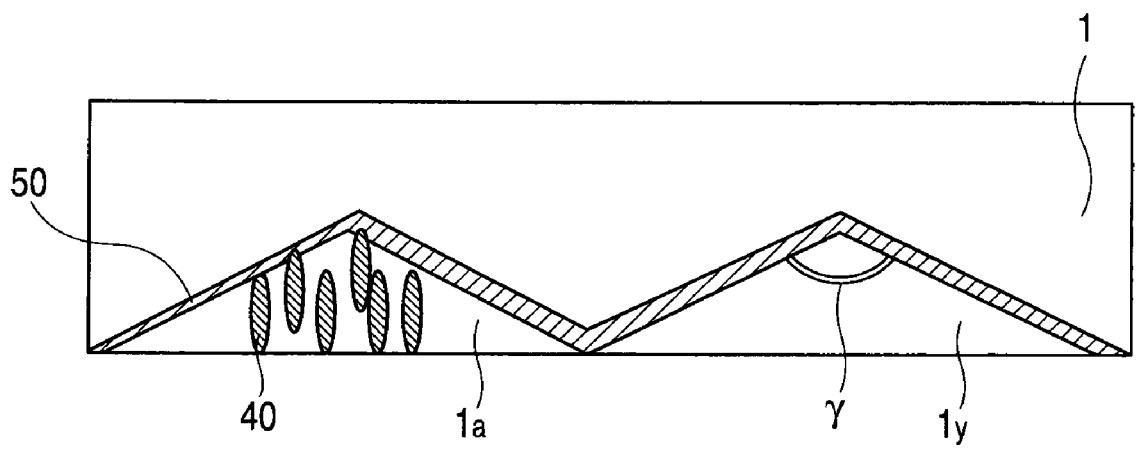
FIG. 20 is a schematic diagram showing the orientation state of liquid crystal molecules in the optical member according to the fifth embodiment of the invention.

FIG. 20 is a schematic diagram showing the orientation state of the liquid crystal molecules in the optical member 1a having the optical anisotropy according to the embodiment. As shown in FIG. 20, the sectional shape of each of the triangular prisms of the groove row 1y provided at the first light guide plate 1 orthogonal to the longitudinal direction of the groove row 1y is an isosceles triangle having a large apex angle γ in a range of about 160 to 175. As shown in FIG. 20, the optical member 1a according to the embodiment is formed in a manner that liquid crystal molecules 40 each having a rod shape are filled in the grooves each having the isosceles triangle having the large apex angle so as to have an orientation that the major axis direction of each of the molecules is almost orthogonal to the flat major surface of the first light guide plate 1, then cured and so formed as the rectangular prism. The optical member has the optical anisotropy which optical axis is orthogonal to the major surface of the first light guide plate 1. The refractive index in the minor axis direction of the liquid crystal molecules 40 differs from that of the first light guide plate 1 and the refractive index in the major axis direction of the molecules is almost same as that of the first light guide plate 1.

In order to form the vertical orientation of the liquid crystal molecules more stably, it is effective to use a thin film of polyimide or polyvinyl alcohol with alkyl chain as the orientation film 50 coating on the groove surfaces 1z of the groove row 1y.

As shown in FIG. 19, the transmission type display apparatus using the backlight device 10 according to the embodiment is configured in a manner that a transmission type display panel 7 is provided on the backlight device 10, the transmission type display panel 7 has a liquid crystal layer 7c between glass substrates 7a and 7b, and polarizing plates 7d and 7e are provided so as to sandwich the glass substrates 7a and 7b therebetween.

In general, in the transmission type display apparatus, the polarizing plate 7e of the transmission type display panel 7 selects only the linear polarization light component from the light emitted from the backlight device 10, and the selected component reaches the liquid crystal layer 7c after passing through the glass substrate 7b. Since most of the polarization plate exhibits absorption dichroism, the polarization light component of the light corresponding to the absorption axis of the polarizing plate 7e is absorbed from the light emitted from the backlight device 10. That is, a half of the light emitted from the backlight device 10 is absorbed wastefully, which is a cause of largely reducing the light utilizing efficiency of the liquid crystal display apparatus.

Thus, as shown in FIG. 20, the backlight device 10 according to the embodiment is arranged to provide the optical member 1a having the optical anisotropy at the groove row 1y of the first light guide plate 1 so as to utilize the light having been used wastefully. The operation of the backlight device will be explained hereinafter.

As shown in FIG. 19, the light emitted from the first light source 2 includes a p-wave 2p of a linear polarized light containing an electric filed component orthogonal to the longitudinal direction of the groove row 1y of the first light guide plate 1, that is, within the drawing sheet and a s-wave 2s of a linear polarized light containing an electric filed component in parallel to the longitudinal direction of the groove row 1y of the first light guide plate 1, that is, within a plane orthogonal to the drawing sheet. This light enters into the light incident end surface 1x of the first light guide plate 1.

The p-wave 2p of the entered light is subjected to the Fresnel reflection at the boundary surface between the first light guide plate 1 and the optical member 1a in accordance with the difference 0.2 of the refractive indexes between the acrylic and the liquid crystal material, then a light component exceeding the critical angle is emitted from the major surface of the transmission type display panel 7 side, then bent in the front direction by the first prism sheet 3 and passes the polarizing plate 7e of the transmission type display panel 7. In this case, since the transmission axis of the polarizing plate 7e is set to the direction passing the p-wave, there is no optical loss at the polarizing plate and so the optical utilizing efficiency is high.

On the other hand, the s-wave 2s of the light entered into the light incident end surface 1x of the first light guide plate 1 and p-wave not reflected at an interface with the optical member 1a from the light source 2 are completely reflected by the bottom surface of the optical member 1a and transmits within the first light guide plate 1. On the way of the transmission, since the s-wave 2s also changes in its phase due to the double refraction property of the acrylic of the first light guide plate 1, the p-wave 2p is generated and so used for the display in the similar manner.

Further, in this embodiment, as shown in FIG. 19, a reflection plates 51 and a quarter wave plates 52 are pasted on the end surface of the first light guide plate 1 in opposite side of the first light source 2. Thus, the light transmitted within the first light guide plate 1 and reached the end surface in the opposite side of the first light source 2 is reflected by the reflection plates 51 and enters into the first light guide plate 1 again. In this case, the s-wave 2s having a high remaining rate is changed into the p-wave 2p by the quarter wave plates 52. The p-wave 2p thus entered again in the first light guide plate 1 is reflected at the boundary surface between the first light guide plate and the optical member 1a and used for the display like the aforesaid case.

As described above, according to the backlight device 10 of the embodiment, since most of the light emitted from the first light source 2 can be extracted as the p-wave 2p from the first light guide plate 1, the light from the first light source 2 can be used efficiently for the display and so the luminance can be enhanced.

Further, since stray light is not generated newly even when the first light guide plate 1 and the optical member 1a according to the embodiment are employed, the light from the first light source 2 can be emitted from the first light guide plate 1 with directivity like the first embodiment. That is, the light rays from the first light source 2 enter into the triangular prism row of the first prism sheet 3 as the light rays a1 having the directivity in the slanted direction with respect to the normal line direction, then are reflected by the slanted surfaces of the triangular prism row and emitted as the right rays a2 having the directivity in the normal line direction from the light outgoing surface 30 of the first prism sheet 3, whereby the emitted light rays are irradiated in the front direction.

Next, the explanation will be made as to the behavior of the light rays b1 entering into the major surface of the first light guide plate 1 from the second light sources 4. The light rays b1 from the second light source 4 include a linear polarization light component 4x passing through the polarizing plate 7e and a linear polarization light component 4y absorbed thereby, and the electric field component of each of these components is in parallel to the planer major surface of the first light guide plate 1. As to the direction in parallel to the major surface of the first light guide plate 1, since there is no difference of the refractive indexes between the first light guide plate 1 and the optical member 1a at the boundary surface therebetween, these linear polarization lights can propagate straightly without being refracted.

Thus, like the first light guide plate 1 of the embodiment, the second light guide plate 11 of the backlight device of the fourth embodiment is provided with a groove row, and the optical member having the optical anisotropy according to the embodiment is adhered to the groove surfaces of the groove row. Accordingly, the light rays b1 from the second light sources 4 can be formed as the light rays having much linear polarization light components passing through the polarizing plate 7e, whereby the utilizing efficiency of the light rays b1 from the second light sources 4 can be enhanced and the luminance of the backlight device 10 can be further improved.

Next, the explanation will be made as to the case where the optical member 1a according to the embodiment is formed by using the discotic liquid crystal molecules each having a disc shape instead of forming by orientating the liquid crystal molecules each having a rod shape as shown in FIG. 20.

Figure 21:
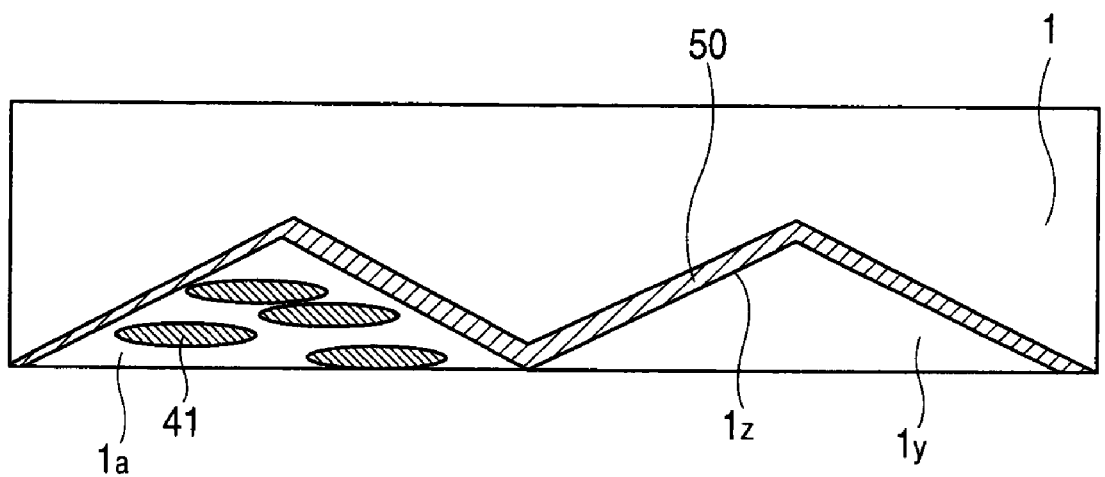
FIG. 21 is a schematic diagram showing the orientation state of liquid crystal material in the optical member of another backlight device according to the fifth embodiment of the invention.

FIG. 21 is a schematic diagram showing the orientation state of the liquid crystal molecules of the optical member 1a according to another backlight device of the embodiment. That is, by using the first light guide plate 1 provided with the groove row 1y having the sectional shape shown in FIG. 20, the discotic liquid crystal molecules 41 each having the disc shape are filled in the grooves of the groove row 1y in a manner that the diameter direction of the molecules is oriented so as to be almost in parallel to the planer major surface of the first light guide plate 1, and are cured. Such the orientation of the liquid crystal molecules can be realized by suitably selecting an orientation film 50 provided at the groove surfaces 1z of the groove row 1y of the first light guide plate.

In this case, the refractive index of the acrylic resin of the first light guide plate 1 is set to be almost same as the refractive index in the radial direction of the discotic liquid crystal molecules of the optical member 1a, and the refractive index of the acrylic is set to be different from the refractive index in a direction orthogonal to the radial direction of the cholesteric liquid crystal molecules 41. Thus, in the similar manner as the aforesaid case using the liquid crystal molecules 40 each having the rod shape, the p-wave is reflected by the optical member 1a, then emitted from the first light guide plate 1 efficiently and so used for the display, whereby the luminance can be enhanced.

Figure 22:
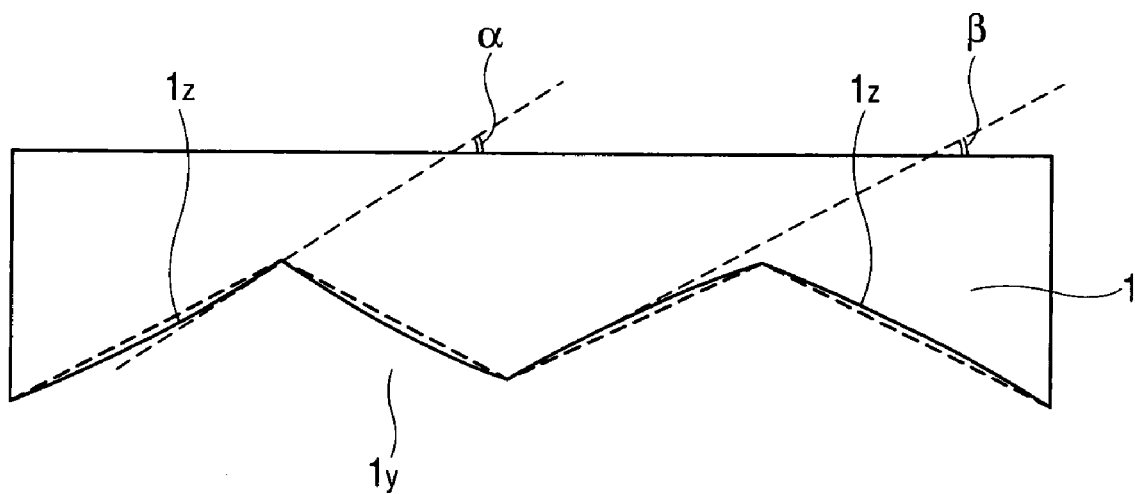
FIG. 22 is a sectional diagram of another first light guide plate according to the fifth embodiment of the invention.

As to this embodiment, as shown in FIG. 20 or 21, the explanation is made as to the case where the shape of the section along the direction orthogonal to the longitudinal direction of the groove row 1y of the first light guide plate 1 is the triangle in which each of the oblique sides is formed by a straight line, and the optical member 1a adhered to the groove surfaces 1z of the groove row 1y constitutes the triangular prism row. However, the shapes of the groove row 1y and the optical member 1a are not limited thereto. That is, as shown in FIG. 22, the shape of the section along the direction orthogonal to the longitudinal direction of the groove row 1y of the first light guide plate 1 is the triangle in which as shown in FIG. 20, each of the oblique sides may not be formed by the straight line but a line slightly bent outward or inward. In this case, when the maximum inclination angles α, β of the curved liens of the oblique sides are set to be in a range of 3 to 10 degree with respect to the major surface direction of the first light guide plate 1, the effects similar to those of this embodiment can be obtained.

Further, in this embodiment, although the optical member 1a is provided on the major surface side of the first light guide plate 1 which is in opposite to the first prism sheet 3 side, the effects similar to those of this embodiment can be obtained even when the optical member is provided on the first prism sheet 3 side of the first light guide plate 1 or the optical members are provided on both the major surface sides of the first light guide plate 1.

Furthermore, although this embodiment is explained as the case where the optical member 1a has the optical anisotropy, the effects similar to those of this embodiment can be obtained even when the first light guide plate 1 has the optical anisotropy or each of the optical member and the first light guide plate has the optical anisotropy. In this case, the materials constituting the first light guide plate 1 and the material 1a are selected so that the refractive indexes of the first light guide plate 1 and the optical member 1a are set to be almost the same value.

In this embodiment, since the ridge line direction of the triangular prism row of the first prism sheet 3 is set to be substantially in parallel to the incident end surface of the first light guide plate 1 for the light from the first light source 2, the light rays emitted from the first prism sheet 3 can be easily uniformed within the plane of the first prism sheet 3. Further, since the longitudinal direction of the groove row 1y of the first light guide plate 1 is set to be in parallel to the ridge line direction of the triangular prism row of the first prism sheet 3, the polarized light can be prevented from rotating at the time of passing through the first prism sheet 3. Furthermore, since the longitudinal direction of the groove row 1y of the first light guide plate 1 is set to be in parallel to the incident end surface 1x for the light from the first light source 2, the irregularity of the luminance hardly arises.

Sixth Embodiment

Figure 23:
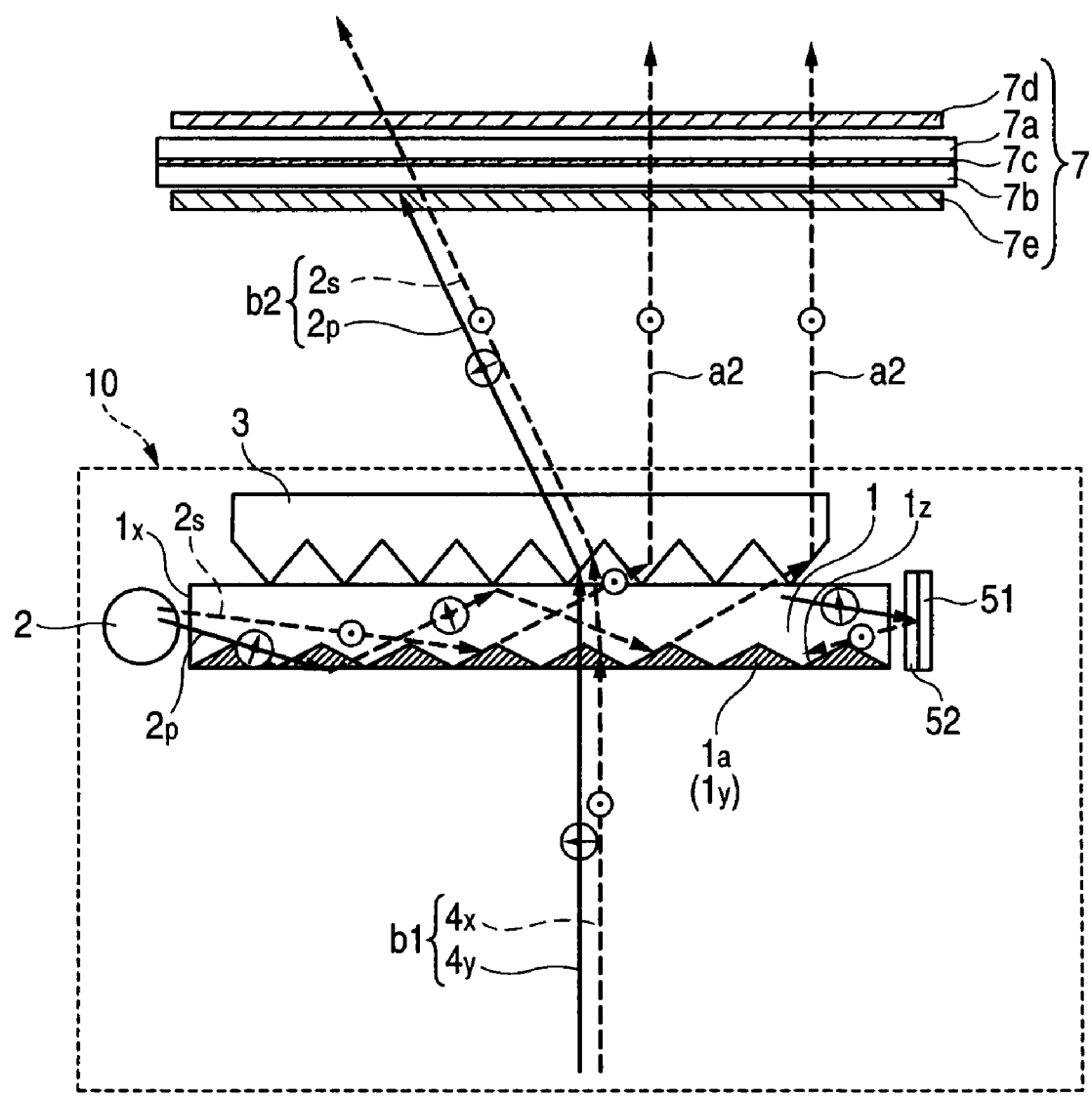
FIG. 23 is a diagram showing the configuration of the backlight device according to the sixth embodiment of the invention and a transmission type display apparatus using the device.

FIG. 23 is a diagram for explaining transmission light paths of a backlight device according to the sixth embodiment of the invention and a transmission type display apparatus using the device and the light transmission state of the transmission type panel. This figure is shown by using a sectional diagram along a plane orthogonal to the longitudinal direction of a groove row provided at the first light guide plate.

The backlight device 10 according to the embodiment is same as the fifth embodiment except that the optical member 1a is obtained by orientating the liquid crystal molecules each having the rod shape used in the fifth embodiment in a direction different from that of the fifth embodiment.

That is, the optical member 1a having the anisotropy according to the embodiment is obtained by orientating the major axis of each of the liquid crystal molecules each having the rod shape in a direction in parallel to the longitudinal direction of the groove row 1y of the first light guide plate 1, that is, the direction orthogonal to the drawing sheet of this figure.

The first light guide plate 1 according to the embodiment is fabricated by using the acrylic resin like the aforesaid embodiments in a manner that, for example, an injection port (gate) for injecting molding material in a melted state into a cavity is provided at the side surface orthogonal to the longitudinal direction of the groove row 1y of the first light guide plate 1 and the first light guide plate is fabricated by the molding injection.

Next, the liquid crystal material having the ultraviolet curing property same as that used in the fifth embodiment is coated so as to fill the groove row 1y of the first light guide plate 1 and is cured by being applied with ultraviolet rays. Then, the liquid crystal molecules each having the rod shape is orientated in a manner that the major axis of each of the liquid crystal molecules is orientated in the direction in parallel to the longitudinal direction of the groove row 1y of the first light guide plate 1, whereby the optical member 1a having the optical anisotropy is formed.

On the other hand, the major axis of each of the liquid crystal molecules 40 each having the rod shape can be orientated in the direction in parallel to the longitudinal direction of the groove row 1y of the first light guide plate 1 thereby to form the optical member 1a having the optical anisotropy in the following manner by selecting rubbing material. That is, after suitably forming the first light guide plate 1 having the groove row 1y, the groove surfaces 1z are subjected to the rubbing processing by the rubbing material, then the liquid crystal material having the ultraviolet curing property is coated and cured by being applied with ultraviolet rays.

The optical axis of the optical member 1a obtained in this manner is in parallel to the longitudinal direction of the groove row 1y.

As shown in FIG. 23, among the light rays which are emitted from the first light source 2 and entered into the first light guide plate 1 from the groove surfaces 1z, the s-wave 2s is subjected to the Fresnel reflection at the boundary surface between the first light guide plate 1 and the optical member 1a in accordance with the difference 0.2 of the refractive indexes therebetween, then a light component exceeding the critical angle is emitted from the major surface of the transmission type display panel 7 side, then bent in the front direction a2 by the first prism sheet 3 and passes the polarizing plate 7e of the transmission type display panel 7. In this case, since the transmission axis of the polarizing plate 7e is set to the direction passing the s-wave, there is no optical loss at the polarizing plate and so the optical utilizing efficiency is high. Since the Fresnel reflection factor of the s-wave is higher than that of the p-wave, the light of the s-wave can be extracted easily from the light guide plate and so the entire utilizing efficiency of the light can be enhanced advantageously.

As described above, according to the backlight device 10 of this embodiment, most of the light rays emitted from the first light source 2 can be extracted as the s-wave 2s from the first light guide plate 1, and so the light from the first light source 2 can be can be used efficiently for the display and the luminance can be enhanced.

Further, since stray light is not generated newly even when the first light guide plate 1 and the optical member 1a according to the embodiment are employed, the light from the first light source 2 can be emitted from the first light guide plate 1 with directivity like the first embodiment. That is, the light rays from the first light source 2 enter into the triangular prism row of the first prism sheet 3 as the light rays a1 having the directivity in the slanted direction with respect to the normal line direction, then are reflected by the slanted surfaces of the triangular prism row and emitted as the right rays a2 having the directivity in the normal line direction from the light outgoing surface 30 of the first prism sheet 3, whereby the emitted light rays are irradiated in the front direction.

Next, the explanation will be made as to the behavior of the light rays b1 entering into the major surface of the first light guide plate 1 from the second light sources 4. The light rays b1 from the second light source 4 include a linear polarization light component 4x passing through the polarizing plate 7e and a linear polarization light component 4y absorbed thereby. The linear polarization light which electric filed component is orthogonal to the longitudinal direction of the groove row 1y of the first light guide plate 1 passes the boundary surface between the first light guide plate 1 and the member 1y since there is no difference of the refractive indexes therebetween. On the other hand, the linear polarization light which electric filed component is in parallel to the longitudinal direction of the groove row 1y of the first light guide plate 1 refracts at the boundary surface between the first light guide plate 1 and the member 1a due to difference of the refractive indexes therebetween. Thus, the apex angle of the optical member 1a is preferably a small value in a range of 170 to 175 degree.

The effects similar to this embodiment can be obtained also in the case where, in place of using the aforesaid optical member 1a in this embodiment, the optical member 1a is formed by orientating the radial direction of each of the discotic liquid crystal molecules 41 each having the disc shape so as to be almost in parallel to the flat major surface of the first light guide plate 1. That is, among the light rays which are emitted from the first light source 2 and entered into the first light guide plate 1 from the groove surfaces 1x, the s-wave 2s can be extracted efficiently from the first light guide plate 1 and used for the display efficiently in the similar manner as described above. In this case, the refractive index of the acrylic of the first light guide plate 1 is set to be different from the refractive index in the radial direction of the cholesteric liquid crystal molecules of the optical member 1a, and the refractive index of the acrylic is set to be almost same as the refractive index in the direction orthogonal to the radial direction of the cholesteric liquid crystal molecules.

Seventh Embodiment

Figure 24:
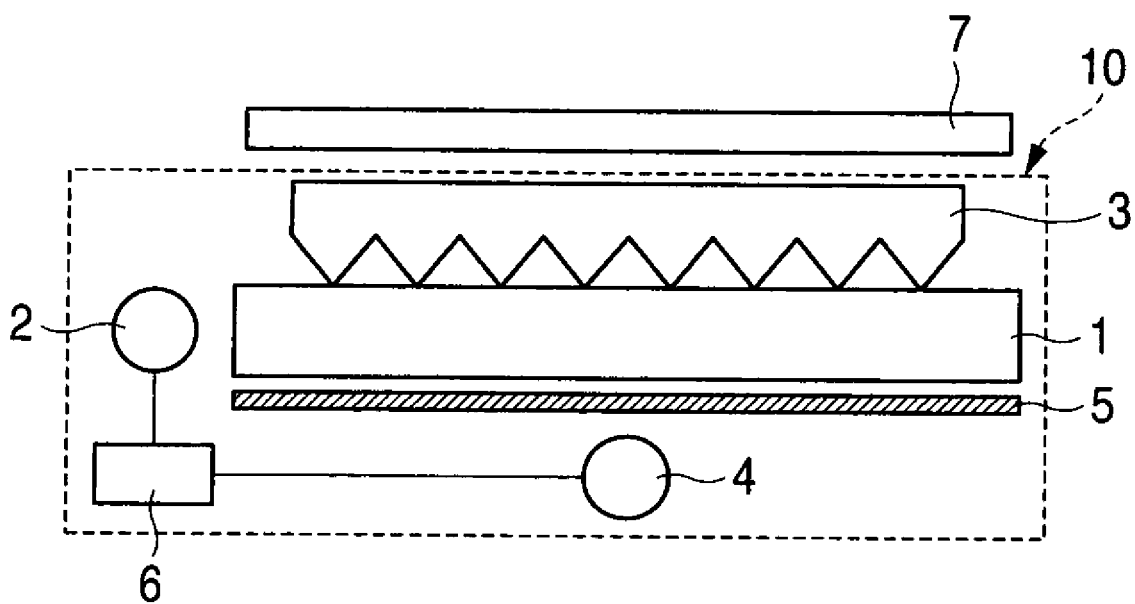
FIG. 24 is a diagram showing the configuration of the transmission type display apparatus according to the seventh embodiment of the invention.

FIG. 24 is a diagram showing the configuration of the transmission type display apparatus according to the seventh embodiment, which employs a transmission type panel 7 and the backlight device 10 according to the first embodiment. An image signal is displayed on the transmission type display panel 7 by an image driving means. In the backlight device 10, the light rays emitted from the first light source 2 are irradiated from the first light guide plate 1, then reflected by the prism surfaces of the first prism sheet 3 and propagate in the front direction. Further, the light rays having the directivity in the normal line direction emitted from the second light sources 2 are bent in the left and right directions by the first prism sheet 3 thereby to illuminate the front direction and left and right directions of the transmission type display panel 7.

In the 10 according to this embodiment, as shown in FIG. 4B, the light rays emitted from the first light sources 2 are converged in an angular range of −20 to 20 degree with respect to the normal line direction and irradiated to a viewer, whereby an image displayed on the transmission type display panel 7 can be conducted to a viewer in the front direction.

On the other hand, as shown in FIG. 5B, the light rays emitted from the second light sources 4 are bent in the left and right directions in an angular range of −30 degree or less and an angular range of 30 degree or more and irradiated to a viewer, whereby an image displayed on the transmission type display panel 7 can be conducted to viewers in the left and right directions away from the front direction.

Figure 25:
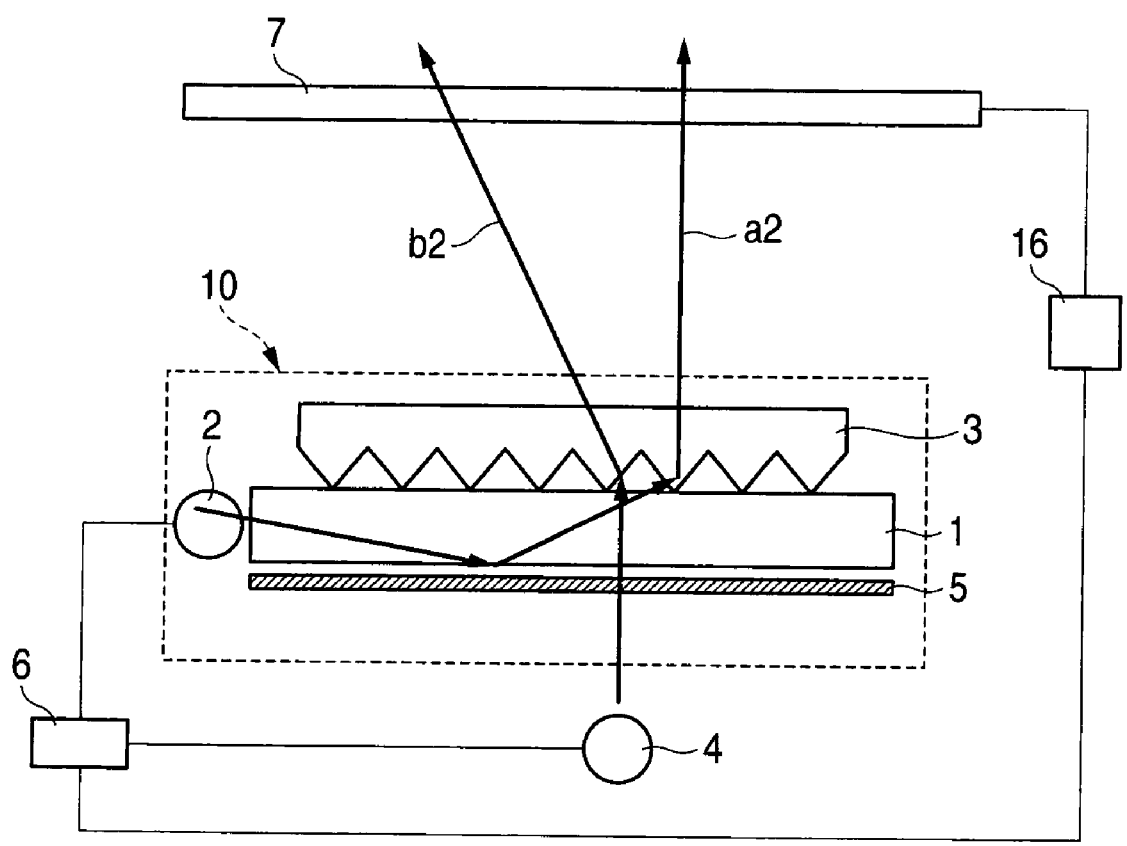
FIG. 25 is a diagram showing the configuration of the transmission type display apparatus according to the eighth embodiment of the invention.

In this embodiment, when the light rays in the front direction and the left and right directions are interdentally adjusted by the light source control portion 6, light rays can be irradiated uniformly with a wide view angle Eighth Embodiment FIG. 25 is a diagram showing the configuration of the transmission type display apparatus according to the eighth embodiment, which is configured by adding a synchronous driving portion 16 to the transmission type display apparatus according to one of the fifth to seventh embodiments.

Two different image signals are displayed alternately on the transmission type display panel 7 by the image driving means, and a first light source for irradiating the front direction of the transmission type display panel 7 and a second light source for irradiating the left and right directions of the transmission type display panel 7 are alternatively switched in synchronous with the respective image signals by the synchronous driving portion 16. To be concrete, by using the synchronous driving portion 16, the first light sources 2 are lightened at the timing where an image for the front direction is displayed ad the second light sources 4 are lightened at the timing where an image for the left and right directions is displayed, and these two kinds of the light sources are switched by the light source control portion 6 in a manner that when one of the two kinds of the light sources is lightened, the other of the two kinds of the light sources is turned off.

FIGS. 26A and 26B are diagrams for explaining an image displayed by the transmission type display apparatus according to the eighth embodiment. Specifically, FIG. 26A shows an image conducted to a viewer in the front direction and an angular distribution of irradiation light rays emitted from the backlight device and FIG. 26B shows an image conducted to viewers in the left and right directions and an angular distribution of irradiation light rays emitted from the backlight device.

In the backlight device 10 according to this embodiment, the transmission type display panel 7 is irradiated by the light rays converged in an angular range of −20 to 20 degree with respect to the normal line direction as shown in FIG. 4B and also by the light rays bent in the left and right directions in an angular range of −30 degree or less and an angular range of 30 degree or more as shown in FIG. 5B. On the other hand, the image driving means alternatively displays on a liquid crystal panel 20 different images, that is, an image A for the front direction and an image B for the left and right directions. To this end, the synchronous driving portion 16 synchronizes the respective image signals with the switching operation between the first light sources 2 and the second light source 4 performed by the light source control portion 6. When the switching operation is performed repeatedly with a frequency of 60 Hz or more, as shown in FIG. 26, a viewer in the front direction can recognize the image A as a bright image and viewers in the left and right directions can recognize the image B as a continuous bright image.

As described above, a visible image can be displayed for a viewer in the front direction and a different image can be displayed for viewers in the left and right slanted directions, whereby an image viewed by a viewer in the front direction can be concealed from peripheral persons.

In the backlight device 10, since the view angle adjusting film 5 is provided on the prism side of the first light guide plate and also on the opposite side of the first light guide plate, light rays leaked downward from the first prism sheet 3 is absorbed, whereby such the leaked light can be prevented from being stray light. Since an amount of the stray light reduces, an amount of light leaked in the left and right directions at the time of lightening the first light sources 4 can be reduced, such a possibility that an image in the front direction is peeped from the left and right directions can be reduced.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A backlight device comprising:
a first prism sheet which has a triangular prism row on a major surface thereof;
a first light source which emits light having directivity in a slanted direction with respect to a normal line direction of a light outgoing surface of the first prism sheet in opposite side to the triangular prism row side so as to enter into the triangular prism row and to be emitted in the normal line direction of the light outgoing surface of the first prism sheet; and
a second light source which emits light having directivity in the normal line direction of the light outgoing surface of the first prism sheet so as to enter into the triangular prism row and to be emitted in a slanted direction with respect to the normal line direction of the light outgoing surface of the first prism sheet.

2. The backlight device according to claim 1, further comprising:
a first light guide plate which is provided on a triangular prism row side of the first prism sheet,
wherein the first light source is provided on an end side of the first light guide plate and the second light source is provided on a major surface side of the first guide plate in opposite to the first prism sheet side.

3. The backlight device according to claim 1,
wherein the light entered into the triangular prism row of the first prism sheet from the second light source has an angular distribution with an angular width of 60 to 80 degree around the normal line direction of the light outgoing surface of the first prism sheet.

4. The backlight device according to claim 3,
wherein an apex angle of the triangular prism row is in a range of 60 to 65 degree.

5. The backlight device according to claim 2, further comprising a view angle adjusting film disposed between the second light source and the first prism sheet.

6. The backlight device according to claim 2, further comprising:
a second prism sheet which has a triangular prism row on a major surface thereof, and which is provided on the major surface side of the first guide plate in opposite to the first prism sheet side; and
a second light guide plate which is provided on a major surface side of the second prism sheet in opposite to the first light guide plate side,
wherein the second light source is provided on an end side of the second light guide plate.

7. The backlight device according to claim 2,
wherein the first light guide plate includes a grove row which is provided continuously on at least one major surface thereof in a manner that a longitudinal direction of the groove row is substantially in parallel with a ridge line direction of the triangular prism row of the first prism sheet, and
wherein an optical member having optical anisotropy is adhered to a groove surface of the groove row.

8. The backlight device according to claim 7,
wherein one of refractive indexes of the optical member is substantially same as a refractive index of the first light guide plate.

9. The backlight device according to claim 7,
wherein the optical member is formed by orientating liquid crystal molecules each having a rod shape in a manner that a longitudinal axis direction of each of the liquid crystal molecules is substantially orthogonal to the major surface of the first light guide plate.

10. The backlight device according to claim 7,
wherein the optical member is formed by orientating liquid crystal molecules each having a disc shape in a manner that a radius direction of each of the liquid crystal molecules is substantially parallel to the major surface of the first light guide plate.

11. The backlight device according to claim 7,
wherein the optical member is formed by orientating liquid crystal molecules each having a rod shape in a manner that a longitudinal axis direction of each of the liquid crystal molecules is substantially parallel to the longitudinal direction of the grove row of the first light guide plate.

12. The backlight device according to claim 6, wherein the second light guide plate includes a grove row which is provided continuously on at least one major surface thereof in a manner that a longitudinal direction of the groove row is substantially parallel to a ridge line direction of the triangular prism row of the second prism sheet, and wherein an optical member having optical anisotropy is adhered to a groove surface of the groove row.

13. The backlight device according to claim 1, further comprising:

a light source control portion which independently controls operations of the first and second light sources.

14. A transmission type display apparatus comprising:
a transmission type display panel; and
the backlight device according to claim 1.

15. A transmission type display apparatus comprising:
a transmission type display panel;
an image driving portion which alternately displays two different image signals on the transmission type display panel;
the backlight device according to claim 13; and
a synchronous driving portion which alternately switches, in synchronous with the image signals, lighting operations of the first and second light sources performed by the light source control portion of the backlight device.

* * * * *